United States Patent
Crosbie et al.

(10) Patent No.: US 9,882,958 B1
(45) Date of Patent: Jan. 30, 2018

(54) NETWORK BASED MACHINE-TO-MACHINE SYSTEM FOR MONITORING

(71) Applicant: Excelfore Corporation, Fremont, CA (US)

(72) Inventors: John Edward Crosbie, Fremont, CA (US); Anoop Balakrishnan, Fremont, CA (US); Shrikant Acharya, Fremont, CA (US); Shrinath Acharya, Fremont, CA (US)

(73) Assignee: Excelfore Corporation, Fremont, CA (US)

( * ) Notice: Subject to any disclaimer, the term of this patent is extended or adjusted under 35 U.S.C. 154(b) by 382 days.

(21) Appl. No.: 14/312,261

(22) Filed: Jun. 23, 2014

Related U.S. Application Data

(62) Division of application No. 13/272,954, filed on Oct. 13, 2011, now Pat. No. 8,761,101.

(51) Int. Cl.
*H04L 29/08* (2006.01)
*H04L 29/06* (2006.01)
*H04W 76/06* (2009.01)
*H04W 76/04* (2009.01)

(52) U.S. Cl.
CPC ............ *H04L 67/02* (2013.01); *H04L 67/42* (2013.01); *H04L 63/08* (2013.01); *H04W 76/045* (2013.01)

(58) Field of Classification Search
CPC ..... G06F 9/4443–9/4856; G06F 21/33–21/44; G06F 9/505–9/5083; H04L 63/0209–63/10; H04L 63/08–63/0853; H04L 9/0618–9/0687; H04L 9/28; H04L 67/28; H04L 67/2861; H04W 4/00–4/005; H04W 76/045

See application file for complete search history.

(56) References Cited

U.S. PATENT DOCUMENTS

| | | | |
|---|---|---|---|
| 7,212,818 B2 | 5/2007 | Haumont | |
| 7,512,799 B1 * | 3/2009 | Chow | H04L 63/0815 713/172 |
| 8,438,633 B1 | 5/2013 | Backholm et al. | |
| 8,761,101 B1 | 6/2014 | Crosbie et al. | |
| 9,167,275 B1 * | 10/2015 | Daily | H04N 21/812 |
| 2002/0098840 A1 * | 7/2002 | Hanson | H04L 1/188 455/435.3 |
| 2002/0103881 A1 | 8/2002 | Grenade et al. | |
| 2002/0165000 A1 | 11/2002 | Fok | |
| 2003/0046273 A1 | 3/2003 | Deshpande | |
| 2003/0061363 A1 * | 3/2003 | Bahl | H04L 63/08 709/229 |
| 2007/0027920 A1 | 2/2007 | Alvarado et al. | |

(Continued)

*Primary Examiner* — Wing F Chan
*Assistant Examiner* — Raji Krishnan
(74) *Attorney, Agent, or Firm* — Brinks Gilson & Lione

(57) ABSTRACT

Methods and systems are disclosed for remote monitoring of mobile computing devices. The method and systems can use cloud-type services to monitor the mobile computing devices. The cloud-type services can include a server that is configured to maintain a virtual link between one or more web-based computing devices and the mobile computing devices. So that, even if the mobile computing devices are not communicating with the server, the server can perform one or more actions to maintain the link between the web-based device and the mobile computing device. The cloud-type services can also include a server that authenticates the mobile computing devices, and that sends a link to the mobile computing device if the mobile computing device is authenticated, the link for use by the mobile computing device to connect to a back-end server that is separate from the server.

18 Claims, 10 Drawing Sheets

(56) References Cited

U.S. PATENT DOCUMENTS

| | | | |
|---|---|---|---|
| 2007/0266082 A1* | 11/2007 | McConnell | G06F 9/505 709/203 |
| 2009/0083835 A1* | 3/2009 | Olson | G06F 21/577 726/3 |
| 2009/0241030 A1* | 9/2009 | von Eicken | H04L 67/00 715/735 |
| 2010/0017596 A1* | 1/2010 | Schertzinger | G06F 21/33 713/155 |
| 2010/0111297 A1* | 5/2010 | Pauker | H04L 9/0687 380/37 |
| 2010/0131654 A1* | 5/2010 | Malakapalli | H04L 67/08 709/227 |
| 2010/0169477 A1* | 7/2010 | Stienhans | G06F 9/5083 709/224 |
| 2011/0213871 A1 | 9/2011 | DiGirolamo et al. | |
| 2011/0269462 A1 | 11/2011 | Sägfors et al. | |
| 2012/0044865 A1 | 2/2012 | Singh et al. | |
| 2012/0079577 A1* | 3/2012 | Hao | H04L 63/10 726/7 |
| 2012/0170451 A1 | 7/2012 | Viswanathan et al. | |
| 2012/0202508 A1 | 8/2012 | Toth et al. | |
| 2012/0214502 A1 | 8/2012 | Qiang | |
| 2012/0222106 A1* | 8/2012 | Kuehl | H04L 63/0209 726/11 |
| 2012/0231828 A1 | 9/2012 | Wang et al. | |
| 2013/0007216 A1* | 1/2013 | Fries | G06F 9/4856 709/218 |
| 2013/0080510 A1* | 3/2013 | Leftik | G06F 9/4443 709/203 |

* cited by examiner

NETWORK BASED MACHINE-TO-MACHINE SYSTEM FOR MONITORING

REFERENCE TO RELATED APPLICATION

This application is a divisional of U.S. application Ser. No. 13/272,954 (now U.S. Pat. No. 8,761,101), which is incorporated by reference herein in its entirety.

TECHNICAL FIELD

This application relates generally to cloud services. More specifically, this application relates to the deployment of cloud services for remote monitoring management applications.

BACKGROUND

M2M (machine to machine) communications today are deployed in several remote monitoring applications involving processes and systems. Remote monitoring has grown rapidly as communication costs have decreased with the expansion of cellular network.

Remote monitoring systems are easy to configure since there are no wires and can come on-line quickly. With zero human intervention, remote monitoring has enhanced the accuracy and the efficiency of reports with the added benefit of 24/7 round the clock, 365 days in a year non-stop operation.

Rapid proliferation of such systems has necessitated an architecture that can scale, can be managed, is cost effective and requires low capital investment. Such a system can be achieved via Cloud computing services provided by several ISPs (Internet Service Providers). The Cloud provides a pay-as-you-go strategy for both processing and storage requirements. One such example is Amazon's ECC (Elastic Cloud Computing) platform and the S3 (Simple Storage Solution) for storage. Host Servers may also provide the functionality to house a monitoring system, albeit the scalability of such servers is limited.

One such remote monitoring system is a telematics monitoring system. Telematics Service Providers provide comprehensive monitoring with their hardware solution to customers using web applications and user portals. Typically, the Telematics Service Providers design web applications around Windows ".NET" using MFC (Microsoft Foundation Classes), with the web applications being hosted at a data center.

BRIEF SUMMARY

Methods and systems are disclosed herein for communicating with one or more mobile computing devices.

In one aspect, a server is disclosed that is configured to maintain a virtual link between one or more web-based computing devices and one or more mobile computing devices. The server comprises a memory and a processor. The memory is configured to store a map of logical connections of the one or more mobile computing devices. The processor is in communication with the memory and configured to: determine a status of the logical connections of the one or more mobile computing devices; update the map of logical connections based on the determined status; receive a communication from the web-based computing device; identify a mobile computing device to transfer at least a part of the communication; determine whether the identified mobile computing device is currently connected based on the map; if the identified mobile computing device is currently connected, send the at least a part of the communication for transmission to the identified mobile computing device; and if the identified mobile computing device is not currently connected, perform at least one action to maintain the virtual link between the web-based computing device and the identified mobile computing device. The at least one action to maintain the virtual link may include storing the communication from the web-based computing device in order to send when the mobile computing device is reconnected. For example, in a continuous connection the mobile computing device is connected except due to a cellular connection problem, the server may send the communication when the mobile computing device reestablishes the cellular connection due to improved cellular coverage. As another example, in a timed connection whereby the mobile computing device is only connected at scheduled intervals, the server may send the communication when the mobile computing device reestablishes the cellular connection at the scheduled interval. The at least one action may also include communicating with the web-based computing device, such as sending a status to indicate that the communication is being processed.

In another aspect, a method is disclosed that is configured to maintain a virtual link between one or more web-based computing devices and one or more mobile computing devices. The method includes determining a status of logical connections of the one or more mobile computing devices; updating a map of the logical connections based on the determined status; receiving a communication from the web-based computing device; identifying a mobile computing device to transfer at least a part of the communication; determining whether the identified mobile computing device is currently connected based on the map; if the identified mobile computing device is currently connected, sending the at least a part of the communication for transmission to the identified mobile computing device; and if the identified mobile computing device is not currently connected, performing at least one action to maintain the virtual link between the web-based computing device and the identified mobile computing device.

In still another aspect, a server is disclosed that is configured as part of a cloud server to authenticate one or more mobile computing devices. The server comprises a memory and a processor. The processor configured to: receive a request for authentication from the mobile computing device; determine whether to authenticate the mobile computing device; and if it is determined to authenticate the mobile computing device, send a link to the mobile computing device, the link for use by the mobile computing device to connect to a back-end server separate from the server. The server optionally may load balance the back-end server, such as by invoking new server instances when new mobile computing devices connect to the back-end server or by relinquishing server instances when the mobile computing devices drop out of the back-end server.

In yet another aspect, a method is disclosed that is configured as part of a cloud server to authenticate one or more mobile computing devices. The method includes receiving a request for authentication from the mobile computing device; determining whether to authenticate the mobile computing device; and if it is determined to authenticate the mobile computing device, sending a link to the mobile computing device, the link for use by the mobile computing device to connect to a back-end server separate from the server. The method optionally may further include load balancing the back-end server, such as by invoking new server instances when new mobile computing devices connect to the back-end server or by relinquishing server instances when the mobile computing devices drop out of the back-end server.

Other features and advantages will become apparent upon review of the following drawings, detailed description and claims. Additionally, other embodiments are disclosed, and each of the embodiments can be used alone or together in combination. The embodiments will now be described with reference to the attached drawings.

DETAILED DESCRIPTION

Figure 1:
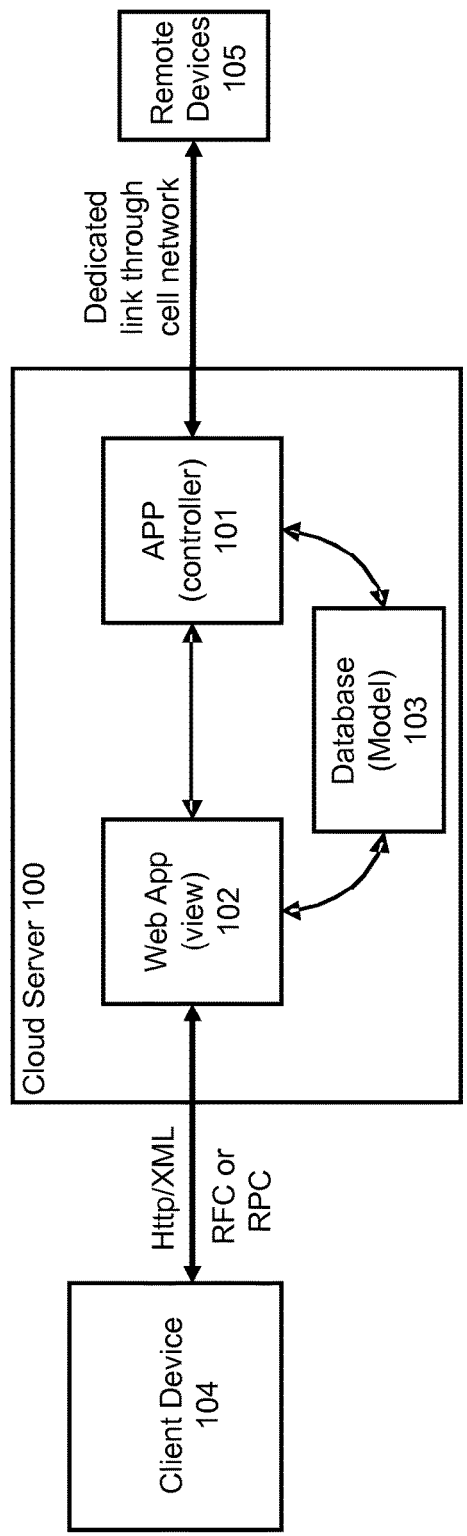
FIG. 1 is a block diagram of Cloud Server 100, Client Device 104, and Remote Devices 105.

A remote monitoring system suitable for use in implementing aspects of the invention is shown in FIGS. 1-10. FIG. 1 illustrates a Cloud Server 100, a Client Device 104, and one or more Remote Devices 105. Cloud Server 100 may be a virtualized server running an operating system, such as Windows or Linux operating systems, that is instantiated via a web interface or API. Cloud Server 100 may behave in the same manner as a physical server. Cloud Server 100 may add hardware resources, such as additional processing or memory capability and may move one or more functions to other hardware while the Cloud Server 100 is running (such as according to load as discussed below).

Figure 9:
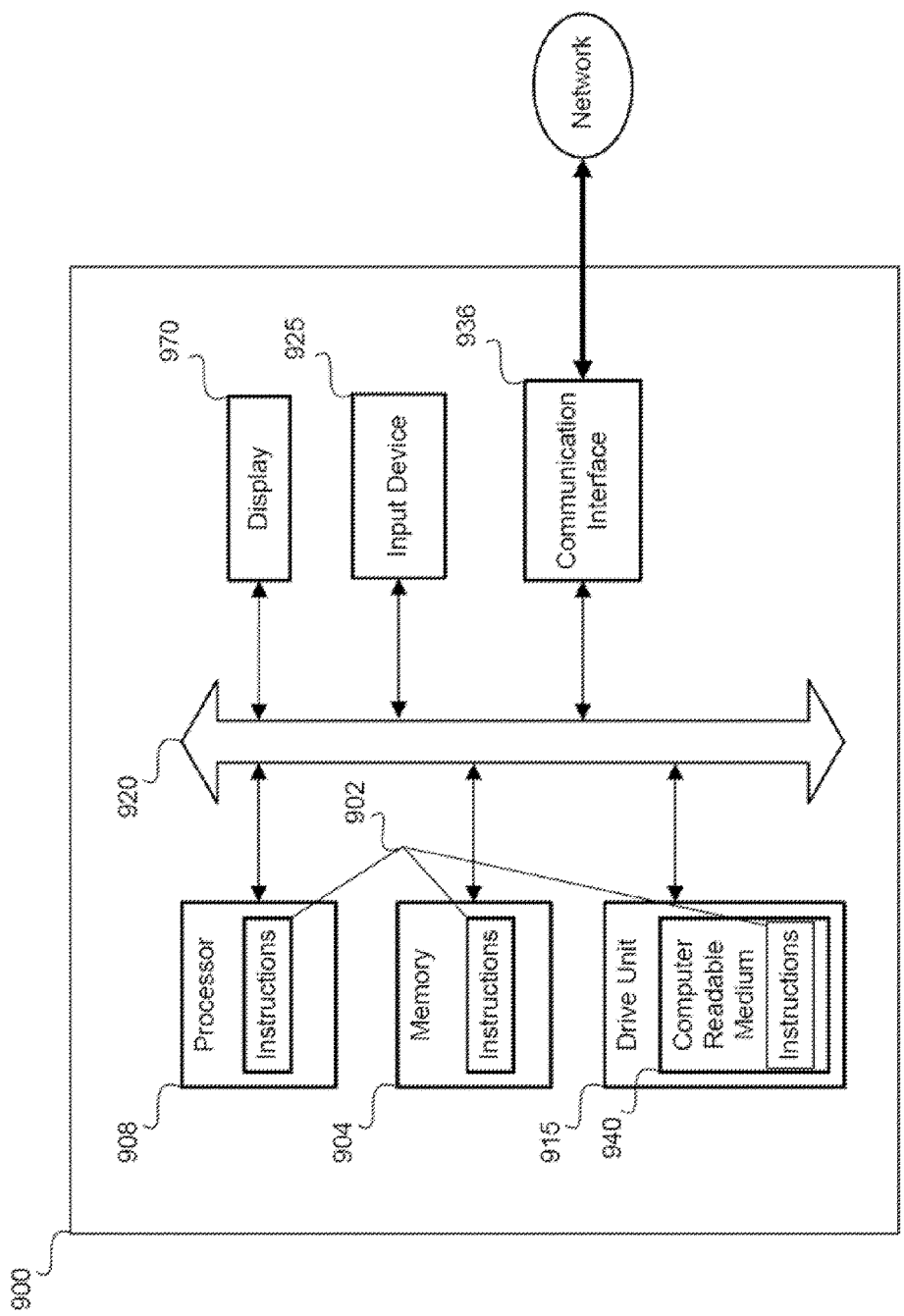
FIG. 9 is a general computer system, programmable to be a specific computer system, which may represent any of the computing devices referenced herein.

Cloud Server 100 may implement cloud computing, provisioning dynamically scalable and virtualized resources. FIG. 9 illustrates an example of the Cloud Server 100. Cloud computing providers deliver applications via the internet, which are accessed from a web browser, while the business software and data are stored on servers at a remote location. Cloud Server 100 may implement one or more web applications.

One implementation of a web application, illustrated in FIG. 1, uses the MVC (Model View Controller) definition for its design. The MVC design pattern may separate the user-interface from the substance of the application. The Model handles the state of the application (e.g., the state is what your application is about), the View is the representation of the user interface), and the Controller receives user actions from the View. MVC is merely one example of a methodology for building websites. Other methodologies are contemplated. One or more programming languages, such as Struts for Java, Maypole for Perl and Rails for Ruby, may use the MVC architecture pattern to organize application programming.

For instance, Ruby on Rails (or RoR) is an open source web application framework for the Ruby programming language, a dynamically typed programming language similar to Python, Smalltalk, and Perl. Ruby on Rails' focus is simplicity, enabling real-world applications to be produced in less code than other frameworks and with a minimum of configuration. Ruby on Rails includes tools that make common development tasks easier "out of the box", such as scaffolding that can automatically construct some of the models and views needed for a basic website.

Rails may include several components, beyond the Ruby programming language itself, including: active record, an object-relational mapping layer; action pack, a manager of controller and view functions; action mailer, a handler of email; action web services; and prototype, an implementer of drag and drop and Ajax functionality.

Ruby on Rails may run on multiple Web servers that support Common Gateway Interface (CGI). The framework may also supports MySQL, PostgreSQL, SQLite, SQL Server, DB2 and Oracle. As discussed above, Ruby on Rails is also an MVC framework where all layers are provided by Ruby on Rails, as opposed to reliance on other, additional frameworks to achieve full MVC support.

The system disclosed in FIG. 1 may be designed as an Open Source Web Framework (OSWF). OSWF provide shortcut helpers for http parsing, scheduling requests, managing concurrency of requests and load balancing as more and more front end clients (web clients) get entertained by the server. Ordinarily, Ruby on Rails is used for Front End Web apps, providing database (DB) syncing and providing process synchronization. These mainly address http/XML or RFC (Request for change) and RPC (Request Procedure Calls) calls. In the apps, the web app architecture is extended to enable the front end app to control and communicate directly with the devices connected to the backend server.

As disclosed in more detail below, the disclosed cloud back end may take a non-traditional path to designing backend web servers. By combining the view (to the user) and the back end application, albeit as two separate child processes, all communication may be synchronized. As discussed in more detail below, virtual links allow the view to control and communicate with one or more end devices (such as send messages to an end device). The backend system authenticates each device with its own H/W signature which can be implemented as a straight code or through a challenge key generation. Hence, end-to-end, the system disclosed in FIG. 1 improves secure monitoring and communication in an M2M Environment.

Both the Front-End (FE) and Back-End (BE) may be designed as part of a single process with several child processes. With a single application, the database (DB) can be sync locked. All helpers' related formats are available to all processes including the device process. For example, FIG. 1 depicts Cloud Server 100 as including two child processes, the APP (or controller) 101 (which may be considered the Front-End application) and Web App (view) 102 (which may be considered the Back-End application). As discussed in more detail below, the APP (or controller) 101 may communicate with Web App (view) 102

APP (controller) 101 may communicate with one or more Remote Devices 105 through a communications link (such as a dedicated link through a cellular network, as depicted in FIG. 1). Web App (102) may communicate with Client Device 104 through a network connection, such as through Http/XML, RFC or RPC. Cloud Server 100 provides the ability to communicate with Remote Devices 105, such as send a message to Remote Devices 105. Client Device 104 may comprise any electronic device that may communicate with Cloud Server 100. For example, Client Device 104 may comprise a desktop computer, a mobile computer, or the like, as discussed in more detail with respect to FIG. 9.

Figure 2:
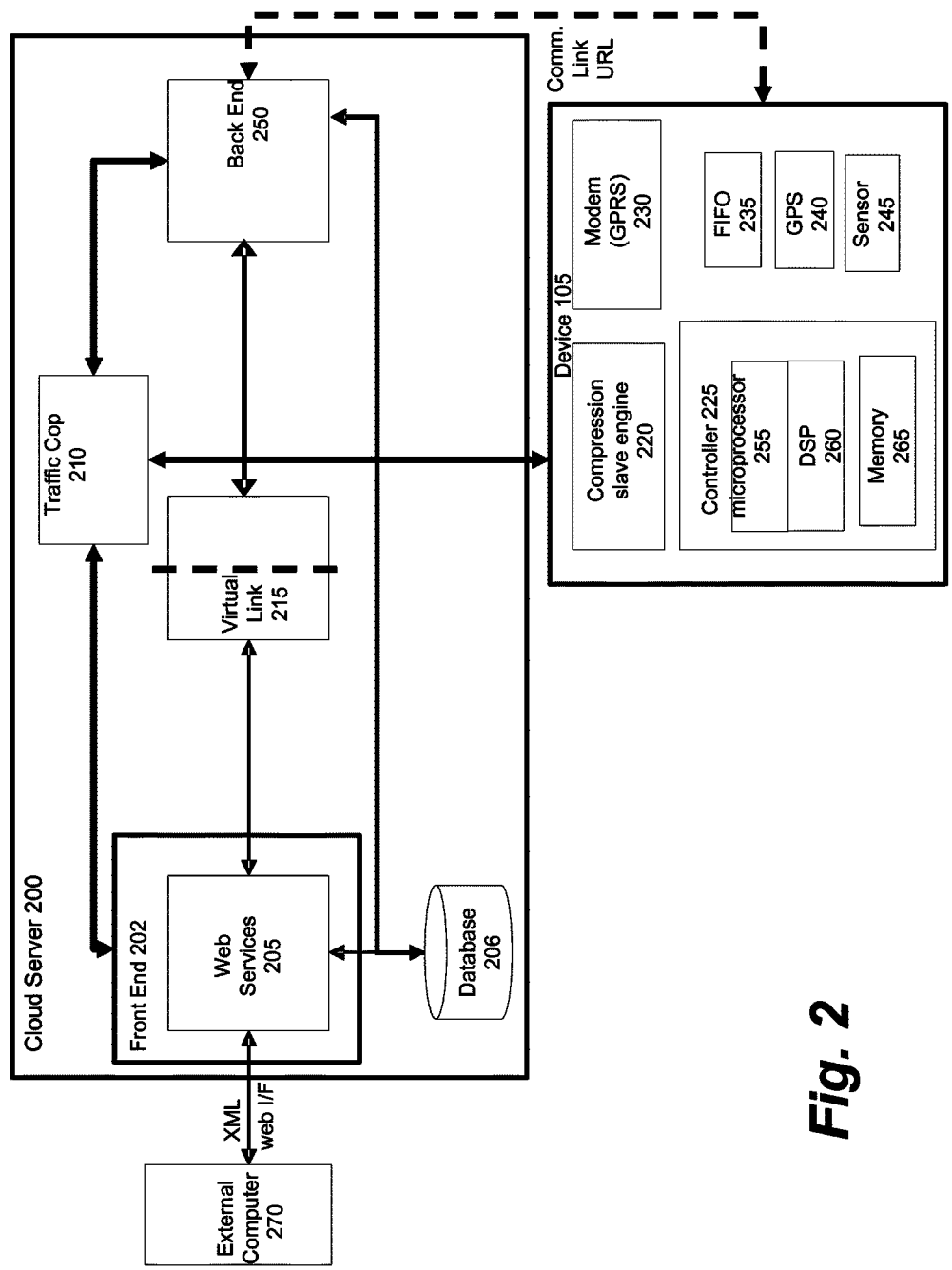
FIG. 2 is an expanded block diagram of Cloud Server 200, External Computer 270, and Remote Devices 105.

As discussed in more detail with respect to FIG. 2, Remote Device 105 may be remote from Cloud Server 100. Remote Device 105 may include a modem with a microcontroller, memory and a list of sensors. Remote Device 105 may communicate with APP (controller) 101 in a variety of ways, such as over GPRS or 1×RTT WAN to its back end application called the controller.

Web App 102 may be considered the view of the MVC, thereby providing the necessary views to the Client Device 104. Client Device 104 is connected to a child process under Web App 102. Client Device 104 may communicate with Remote Device 105 via a virtual link, as described in FIG. 2. Client Device 104 and Web App 102 may communicate through one or more standard networking protocols, such as standard http/XML calls, through Remote Procedure Calls (RPC) or through Request for Change (RFC) triggers. Client Device 104 may login into the Web App 102 through a browser login or through RPC.

As shown in FIG. 1, all the modules may reside on a single instantiated server on the cloud. In an alternative embodiment, the modules may reside on multiple servers in the cloud. The number of servers instantiated may depend on the load and number of Remote Devices 105 that are being monitored, as discussed in more detail below.

As discussed in the background, web monitoring applications are written as a separate stand-alone application with a non-distributed architecture that is hosted at a data center. Further, database resources are maintained by a separate process. In a telematics system, data from the remote devices come in short packets. Previous telematics systems referenced in the background section creates problems. One problem is that the web monitoring applications and the user portal are separate processes, so that any database synchronization will be difficult as the resource lock has to be properly executed to prevent a conflict between asynchronous accesses. Another problem is that the web monitoring application, designed as a separate standalone application, is hosted on a dedicated server.

The architecture presently described improves over the telematics systems referenced in the background section. Since the computing and storage resources are housed in a cloud, there are no dedicated or datacenter hosted servers. It is also flexible and if needed can be hosted on a dedicated server. Furthermore, the system may be designed using open source web server frameworks so that all the applications reside within a single process. In this way, synchronization may be more easily maintained between child processes (such as access to a database resource between child processes may be performed without undue difficulty).

FIG. 2 illustrates an expanded block diagram of the system depicted in FIG. 1. FIG. 2 illustrates another example of a cloud server, illustrated as cloud server 200. Cloud Server 200 includes Front End 202, Traffic Cop 210, Virtual Link 215, Back End 250 and Database 206.

Cloud Server 200 communicates with External Computer 270. Though FIG. 2 illustrates a single External Computer 270, Cloud Server 200 may communicate with multiple External Computers 270. External Computer 270 may execute a client application (similar to Client Device 104). External Computer 270 may communicate with Front End 202 of Cloud Server 200 via a browser, such as communicating via http in XML. Front End 202 may comprise one or more web-services process, which enables communication with External Computer 270 on one end and enables communication with devices 105 (through Virtual Link 215 and Back End 250).

Virtual Link 215 may maintain a map of one, some, or all of the logical connections of Remote Device 105. As discussed in more detail below, Remote Device 105 may connect with Back End 250 at any given moment. The connection between Remote Device 105 and Back End 250 may fail. In one embodiment, the connection between Remote Device 105 and Back End 250 may be via a cellular or other wireless connection (such as communication between Remote Device 105 and Back End 250 being at least partly via cellular or other form of wireless communication), and the failure may be a failure to maintain the cellular connection. In an alternate embodiment, the connection between Remote Device 105 and Back End 250 may be via a landline connection, and the failure may be a failure to maintain the landline connection. Virtual link 215 manages the logical device connections by communicating with Back End 250 in order to maintain a seamless connection with Remote Device 105, even if the connection to Remote Device 105 is temporarily lost. In this way, Front End 202 may communicate with one or more devices 105, such as send messages to and retrieve status from each Remote Device 105 currently connected to Back End 250. A user of External Computer 270 may browse Front End 202, and will have the appearance that the user is communicating directly with Remote Device 105. In reality, the user is communicating (such as sending instructions to Remote Device 105) via Virtual Link 215. Moreover, the losses of connection to 105 will be transparent to the user. Thus, Virtual Link 215 may provide the appearance (to the user of External Computer 270) that the link to one, some, or all of the Remote Devices 105 is maintained, even though the link may be temporarily lost.

The virtual link may maintain a list of connections with the remote devices that are communicating with the backend. There are different connection instances supported by the backend. The most common is the "timed connection". All connections are timed events. In one embodiment, the timed interval can be made very long so as to be a continuous connection, if the system so desires. In an alternate embodiment, all connections are short time events.

In this case, each remote device when connected to the backend forms a session. Each session may last a few seconds or may last several minutes. Each session can originate every timed interval. This timed interval between connections by the remote device is with the backend. Further, this timed interval can be preset for the device when it is initially configured. This interval, for example, could be 10 second, 10 minutes, 1 day, 10 days or even a month, and is programmable depending on how the device is utilized. For example, a utility may require receipt of information from a remote meter every 2 days. All messages for the remote device from the front end process are presented to the Virtual Link 215 and spooled (or stored) for delivery when the timed connection session occurs for the remote device.

The second connection type is an "Emergency Connection". This connection is initiated if and only if the remote device has stopped responding to the server without reason. An emergency connection can be initiated by the user or by the housekeeping thread in 502. Emergency connections can be established through several mechanisms. One such mechanism is sending an SMS to the device to wake up or could even be a special carrier signal (FM tone with an ID marker) at a specific frequency that the device is listening to wake up. For example, the emergency connection may be sent in response to a determination that the identified remote device has a next scheduled connection that is too remote (e.g., the next scheduled connection is the next day, and the communication needs to be sent within 1 hour). As another example, the emergency connection may be sent in response to a determination that the identified remote device failed to communicate during its normal connection time (e.g., the identified mobile computing device was supposed to communicate the previous day, yet failed to communicate). As still another example, the emergency connection may be sent immediately without determining the next scheduled connection.

Remote devices may lose their connection due to dropped connection. This can happen due to weather, loss of power in the cell tower, loss of power in the device etc. This would be termed as an "intermittent connection". Finally, if the remote device stops communicating completely despite several reasons to wake up, then the remote device is deemed as "lost" or dead and a formal message is posted against the device ID back to the front end and the remote device is removed from the Virtual Link Map.

Figure 4:
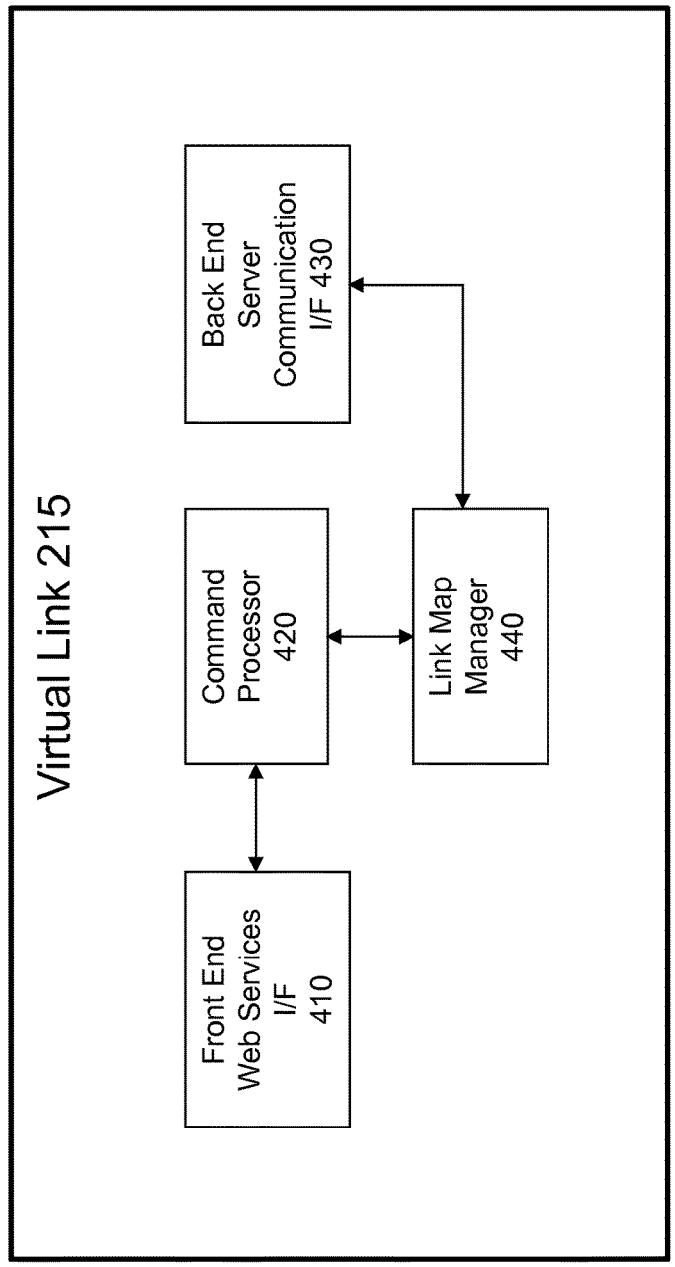
FIG. 4 is a block diagram of Virtual Link.

FIG. 4 illustrates an expanded block diagram of Virtual Link 215. Virtual Link 215 includes a Front End Web Services Interface 410, which communicates with the Front End 202. In one example, Front End Web Services Interface 410 may compile one or more communications from Front End 202 to send to Command Processor 420. For example, the user of External Computer 270 may send one or more commands to Front End 202. Front End 202 may send one or more commands to Front End Web Services Interface 410, which in turn may forward one or more commands to Command Processor 420. Regardless of whether the cellular connection with Remote Device 105 is lost, Front End 202 compiles one or more commands and Front End Web Services Interface 410 forwards to one or more commands. Because of this, the user of External Computer 270 may be unaware of the lost connection with Remote Device 105.

In addition to receiving the one or more commands, Command Processor 420 receives communication responses for the device connections. For example, Command Processor 420 receives data and/or status to send back to Front End 202 (responsive to a previous command send from external device 270) or for storage in the Database 206.

Virtual link 215 may support one or more methods for connecting Front End 202 with Remote Device 105. First, Back End 250 may create for each connected Remote Device 105 a listening port. When the Front End 202 has a command/config/control message to send to the Remote Device 105, Front End 202 will connect to this port (locally or remotely) and communicate over network connection. In one embodiment, Back End 250 and the Front End 202 are located on separate physical machines. This communication methodology thus assists in keeping the Back End 250 and the Front End 202 on the separate physical machines. Second, Front End 202 may make use of Database 206 to send the command/control/config messages to the Back End 250, and then notify the Back End 250 through a signal over the network port dedicated to broadcast new device information present from the Front End 202.

Figure 5:
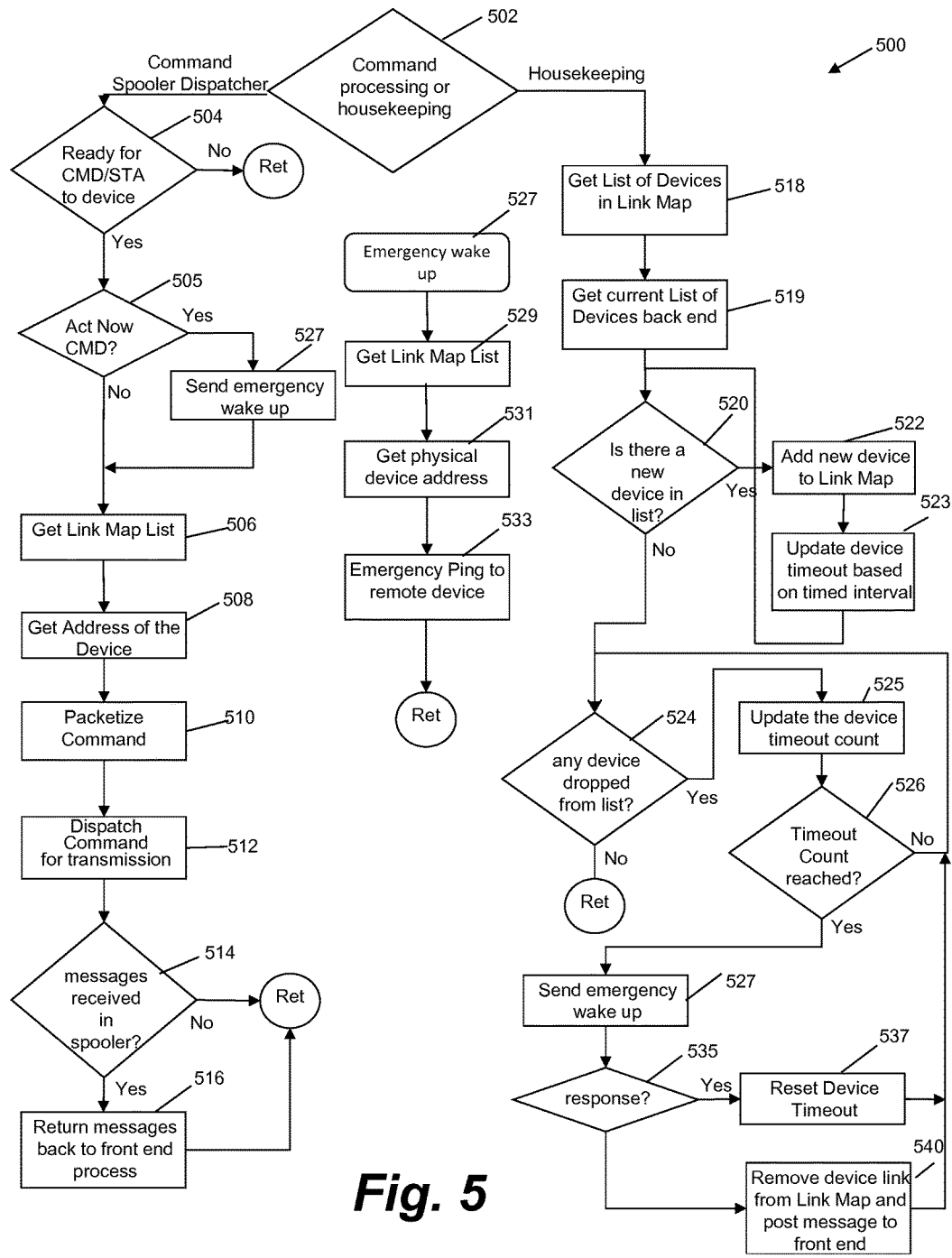
FIG. 5 is a flow diagram of processes of Virtual Link.

Referring to FIG. 5, there is shown a flow chart 500 for processing of the Virtual Link 215. Flow chart 500 includes two child threads, including a command processing thread that includes blocks 504-516, and a housekeeping thread 518-540. In one embodiment, Virtual Link 215 includes functionality for both the command processing thread and the housekeeping thread, as shown in FIG. 5. Alternatively, Virtual Link 215 includes functionality for only one of the command processing thread or the housekeeping thread. FIG. 5. Includes a special module 527-533 for emergency wakeup of devices that have gone off line.

As shown at block 502, it is determined whether to perform command processing functionality or housekeeping functionality. If command processing is to be performed, at 504, it is determined whether there are any communications that need to be sent to one or more devices 105. Each of the devices 105 may include a unique identifier (such as a unique serial number). The command or status request may include the unique identifier in one of the fields. In this way, the command or status request may be used to identify one of the devices 105.

As discussed above, External Computer 270 may request to communicate with Remote Device 105 (such as send a command or request a status inquiry via web services 205). Alternatively, Cloud Server 200 may periodically send a command or request a status inquiry from Remote Device 105 without prompting from External Computer 270. In one embodiment, the External Computer 270 may want to sent a message out of turn, e.g. waking up the device which is not yet timed to communicate, to force it to establish connection with the backend.

In 505, it is checked if there is an "Act Now" command status set for the remote device. If so, 527 is executed to wake up the remote device out of turn. The control of the program returns to normal flow to send the command to the device. If a communication needs to be sent to an identified device (e.g., a command is ready), at 506, a link map list is retrieved. The link map may be used to determine a communication status of one, some or all of the devices 105 (such as the communication status of the device that is identified in the command or status request). For example, the link map may correlate the unique identifier of a device with one or more aspects of the device. Examples of aspects of the device include whether the device is currently "active" and/or whether the communications with the device are currently valid (such as whether the cellular connection with the device is operational). In addition to include the current aspects of the device(s) 105, the link map may include previous aspects of the device (such as the last time in which a communication was active or valid). The link map is merely one type of memory construct to determine a current status of at least one aspect of the device(s) 105. Other memory constructs are contemplated.

At 508, it is the device address is determined. As discussed above, the unique identifier may be used to search the link map to determine the list of active devices. If the device (as identified in the command or status request) is not active and/or valid, the Virtual Link 215 may store the command (or status request), and may try to send the command (or status request) later. In this way, if communications are temporarily interrupted (such as a temporary disruption of the cellular communication with the identified device or a timed connection), the Virtual Link 215 may store one or more commands (or one or more status requests) and may send the command(s) or status request(s) for later transmission when the cellular communication to the identified device is reestablished.

Further, the Virtual Link 215 may optionally send a communication to the External Computer 270 to give the appearance to the External Computer 270 that the link to the identified device 105 is maintained. As discussed in more detail below, communication with the remote device may not be active for a variety of reasons. As one example, the cellular connection may be temporarily disrupted, resulting in a loss of communication with the Virtual Link 215. As another example, the remote device may periodically connect with the Virtual Link 215 (such as once every hour, once every day, etc.) in order to conserve power in the remote device. Regardless, the Virtual Link 215 may communicate with the External Computer 270 in order to compensate for the unplanned or planned disruption of communication with the remote device 105.

One example of a communication to the External Computer 270 may be indicative that the command sent from the External Computer 270 is being processed. In particular, in response to receipt of the command (or status request) and in response to the determination of a disruption of communications with the identified device, the Virtual Link 215 may send a response to receipt of the command (or status request) for output on the External Computer 270. The response may indicate that the command (or status request) is "being processed". Alternatively, the Virtual Link 215 may send a response to the External Computer 270 indicating when the remote device 105 is scheduled to next periodically connect with the Virtual Link 215 (such as indicating that the remote device is scheduled to reconnect in 10 hours). Moreover, the Virtual Link 215 may send additional communications to the External Computer 270 to give the appearance that the communication has not been disrupted. For example, once communication with the remote device 105 has been reestablished, the Virtual Link 215 may send the command (or status request) to the remote device 105. After the Virtual Link 215 receives acknowledgement from the remote device 105 that the command (or status request) has been received, the Virtual Link 215 may send a subsequent communication to the External Computer 270 (including a time-stamp of the time when the remote device 105 received the command or status request) to indicate that the remote device 105 has received the command (or status request). Further, once the Virtual Link 215 receives a response to the command (or status request), the Virtual Link 215 may send the response to the External Computer 270. In this way, the Virtual Link may give the appearance to the user of External Computer 270 that the communication has not been disrupted.

If the device is active and/or valid, the command (or status request) is packetized at 510, and dispatched for transmission at 512. For example, Virtual Link 215 may send the command (or status request) to Back End 250 for transmission to the Remote Device 105. The command (or status request) may include the unique identifier so that Back End 250 may send the command (or status request) to the particular Remote Device 105 that is associated with the unique identifier.

At 514, it is determined whether any communications (such as packets) have been received. If not, the flow chart 500 returns. If so, the communication is reviewed for transmission to the correct receiving party. For example, the packet may be sent from a particular device. One of the fields of the packet may include the unique identifier of the Remote Device 105. Discussed below are examples of the fields of the packets. At 516, The Virtual Link 215 may review the packet to determine which External Computer 270 (from multiple External Computers 270 communicating with the Cloud Server 200) to distribute the message in the packet. In this way, the correct user may receive the response to the command or status inquiry. Each device connected to the back end is provisioned with a unique ID which is recorded by the backend sever. During the house keeping thread execution, the current connected device information is matched again that of the Virtual Link Map and any devices are added or deleted or flagged as inactive. When messages are received they are identified with the remote device ID and that is matched pack to the corresponding request generated by the front end process. In this way the proper message is delivered to the right computer 270. As discussed previously, if a direct communication is received from the Front End (FE) process, then it will be used to send messages back to the same Front End process. In the event a database is also employed then the database will be updated and the link information is sent back to the Front End process that initiated the original request.

If housekeeping is to be performed, at 518, the current list of Devices in the Link Map is obtained. At 519 the current list of actual connected devices are retrieved from the back end. At 520, the Virtual Link map and the backend server connection list is examined to determine whether there is a new device. If so, a new link is added to the link map at 522 and a timeout count is calculated based on the "timed interval" configured for the remote device. The flow chart 500 returns to block 520 to determine if there are any other new devices.

If not, at 524, it is determined whether there is any device that is dropped from the list. There are two situations, one situation being a permanent connection drop and the second situation being a temporary connection drop (e.g., timed connection or because of transmission link being dropped). The Virtual Link 215 may not know a priori if the connection has dropped. In order to determine if a remote device connection has dropped permanently, the Virtual Link 215 maintains a connection time-out count at 525 for each device that becomes disconnected. At 526, it is verified if the timeout has reached for a dropped connection. If timeout is not reached, the control goes back to 524 to evaluate other devices in the list. Otherwise, an emergency wake up is initiated at 527. The emergency wake up process involves getting the Link Map in 529, acquiring the device address in 531 and then sending an SMS message to the device that is no longer communicating; alternatively, a carrier signal, such as FM broadcast transmission with ID to locate a specific device, can be transmitted to wake up the remote device. The housekeeping thread now may review the connection list to see if the remote device has commenced communication or not. Otherwise, the remote device can be removed or flagged as no longer active in Virtual Link Map. If the emergency wake up fails, then at 530 the link reference in the Virtual Link map may be deleted or just flagged as no longer communicating with a corresponding message posted back to front end process to relay to the computer 270. If the emergency wake up succeeds, then the time out count is reset for the device. The loop may run until all the devices are checked. As discussed above, devices 105 may be dropped for one or more reasons. One reason is a fault in the cellular communication. For example, the cause for communications to drop may be if the moving asset (e.g., one of the devices 105) has encountered a dead zone, one of the devices 105 has lost power, or one of the devices 105 has moved into a geographical zone not covered by the communication medium (lack of a signal). If a device has been dropped from the list, the device link is removed from the Link Map, and the flow chart 500 returns to block 524 to determine if there are any other dropped devices. In this way, the Virtual Link 215 may maintain records for an administrator of the system to review access data for the device, such as the audit trail of number of connections and/or disconnections. The access data may include, without limitation, data indicative of how long a particular Remote Device 105 was connected, data indicative of how many times the connection was dropped, indicative of how long was the connection dropped, etc. Thus, the administrator may analyze the connection to a particular device for reliability of the connection.

This housekeeping thread may refresh the list of active devices regularly (such as on a predetermined periodic basis). The Link Map is available in the Virtual Link module. The Back-End process may always maintain its list of current connections. The housekeeping thread may monitor the Back-End list and periodically synchronize its Link Map.

In one embodiment, the Virtual Link may always treat any device connection as a new device connection even though it may have been connected previously. Each remote device is assigned to a specific process instance, so when a connection is identified as belonging to that process instance, then the older link of the same device instance is relinquished and the new link instance is established as the new instance of the device connection. All connection logging history is available in the back end repository database. The Virtual Link does not have knowledge that a link has dropped temporarily or permanently. However, Virtual Link maintains a time out marker, as discussed above.

In this way, the present system of information interchange between the Remote Device 105 and the monitoring interface is simple and effective to implement. For example, implementing a new web service does not require re-architecting of the database. The database may be any one of a multitude of formats, such as Oracle, SAP, SQL, etc. The system described may be ported to another system with a different database. As described below with respect to FIG. 8a, the Active Record Object Translator 803 acts as an interface—803 does the translation—803 extracts the information in a generic format so that it can stored generically regardless of the database protocol. So that, the system does not need to rely on a typical front end process (web process) to define how the database engine works.

The Virtual Link 215 thus allows for command and status communication with end devices, albeit through an imaginary interface. This allows the Front End 202 to communicate with an image of the remote device. If the Remote Device 105 suddenly disconnects and reconnects, this disruption in communication does not affect communication on the Front End. All command and status requests may be spooled during the time the communication remains disconnected, and are restored when connection is re-established with the Back End server 250. The Virtual Link 215 therefore allows the front end process to complete its transaction without having to get acknowledgement from the remote device.

Back End 250 communicates with Traffic Cop 210. Further, Front End 202 communicates with Traffic Cop 210. As shown in FIG. 2, Traffic Cop may send communications to and receive communications from Front End 202 (such as receiving a command from Front End 202 and sending status to Front End 202). As discussed in more detail below, Traffic Cop 210 performs one, some, or all of the following functions: receives configuration data periodically from Front End 202; load balances server processing capacity against the number of Remote Devices 105 being monitored; authenticates each initial connection from a Remote Device 105; and disconnects a device connection.

Figure 6:
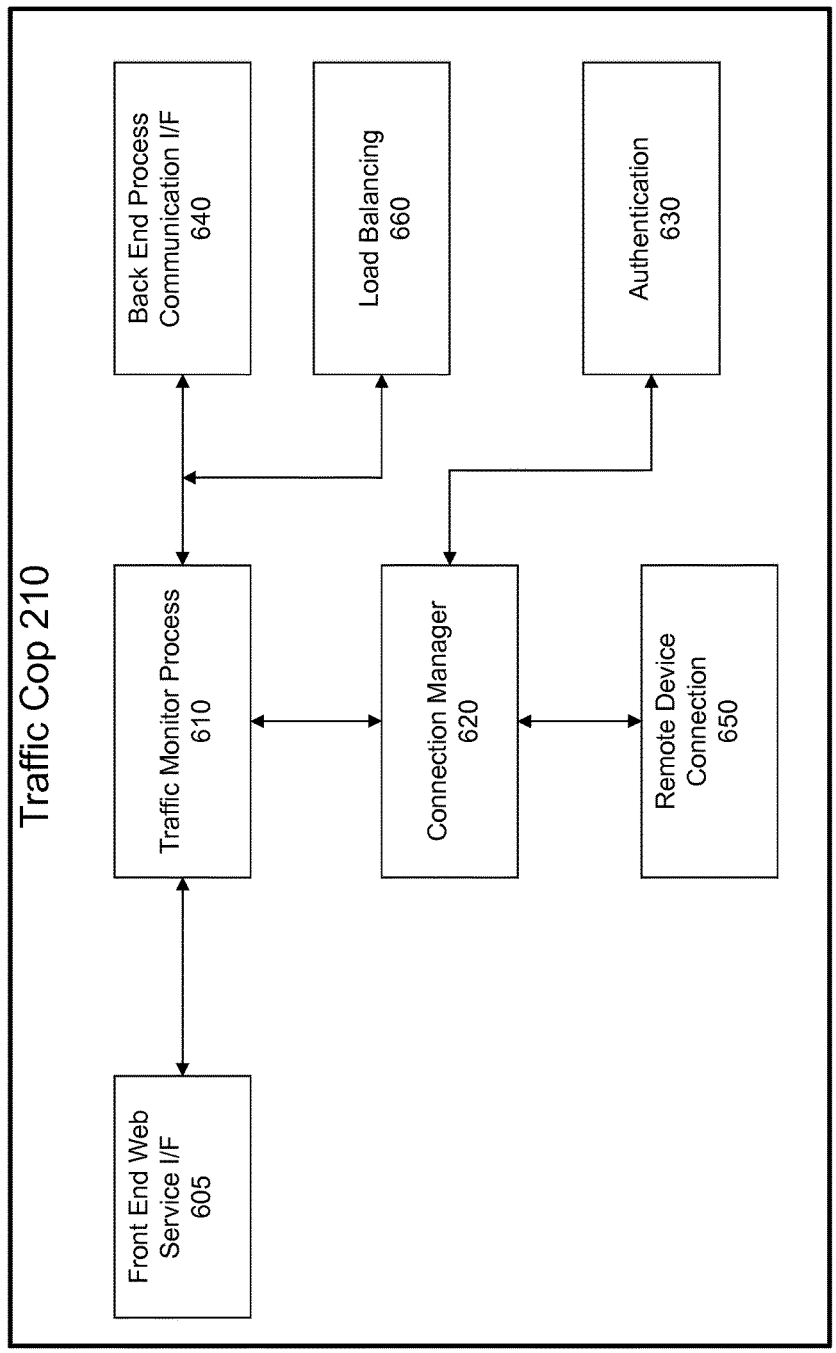
FIG. 6 is a block diagram of Traffic Cop.

FIG. 6 illustrates an expanded block diagram of Traffic Cop 210. Traffic Cop 210 serves as the main gateway for one, some, or all of the Remote Devices 105 to connect initially with Cloud Server 200. Traffic Cop 210 may comprise one or more computers performing the functionality described in FIG. 6 including interacting with Front End 202, interacting with Back End 250, communicating with remote device(s) 105, authenticating remote device(s) 105, and load balancing. In particular, the Traffic Cop 210 may include the functionality of Traffic Monitor Process 610. The Traffic Monitor Process 610 is initiated by Front End Web Services Interface (I/F) 605, which communicates with the Web Services 205 of Front End 202. In particular, Traffic Cop 210 is instantiated and initialized by Web Services 205. Initialization may include Web Services 205 sending one or more parameters for Traffic Cop 210 to use during operation. After initialization, Traffic Cop 210 may send status information to Web Services 205. In an alternate embodiment, Traffic Cop 210 is instantiated and initialized by Back End 250, with Back End 250 sending one or more parameters for Traffic Cop 210 to use during operation.

One, some, or all of Remote Devices 105 connect initially with the Cloud Server 200 via Traffic Cop 210. In particular, the Remote Devices 105 initially connect with remote device connections 650 using Connection Manager 620. Further, Traffic Cop 210 may authenticate the remove device(s) using Authentication 630. Authentication 630 may include validating for security and clearance. The Traffic Cop 215 authenticates each new device connection request in order to prevent rogue devices from connecting and potentially disrupting communication (such as creating a denial of service attack within Cloud System 200). The Traffic Cop 215 may validate the Remote Devices 105 in one of several ways. One of the ways the Traffic Cop 215 performs authentication is by validating the unique device signature of the Remote Device 105. The unique device signature has a software key and a hardware key (or ID). The software key is a unique key that is created for the Remote Device 105 by the cloud system 200. The hardware key is pre-programmed in each Remote Device 105 and is encrypted. The Traffic Cop 215 may validate the Remote Device 105 using the software key and the hardware key. The authentication of the remote devices 105 is merely for illustration purposes only. Other authentication schemes are contemplated.

If Authentication 630 authenticates a remote device, the remote device is provisioned for connection to the backend and that information is sent by Connection Manager 620 to Traffic Monitor Process 610. Traffic Monitor Process 610 then communicates the connection information (such as link information) to the authenticated remote device via Connection Manager 620 and Remote device connection 650.

In this way, the Traffic Cop 210 facilitates with connection of Remote Devices 105 with Cloud Server 200. This is unlike the Remote Devices 105 initially connecting with Back End 250. In particular, Remote Devices 105 may have hardwired (or stored in memory 265) the Communication Link URL for the Back End 250, so that the Remote Devices 105 initially connect with Back End 250. In such a configuration, Back End 250 must perform authentication and service the Remote Devices 105. However, with Traffic Cop 210 performing the authentication and then sending the Communication Link URL, the authentication function may be separated from the connection function. For example, the Back End 250 may be relieved of the requirement to authenticate the Remote Devices 105 and may focus on connection with the Remote Devices 105. In one embodiment Traffic Cop 210 may send an additional security token, such as an RSA token, for encryption which may expire within a predetermined time period if not used (see updated setup 716). The remote device, when it receives the token, makes a connection to the backend using the token to encryption information. This adds a layer of additional security to the connection. Traffic Cop 210 may provide the same token given to the remote device to Back End 250 so that Back End 250 may use the token for the authentication process and decrypt the information received from the remote device. Each device may be provisioned in the field after being assigned a unique ID and security token (encryption key) which may be used as a Hash Key for all communications. In this way, Traffic Cop 210 may reduce or eliminate a rogue device connection to the backend.

Traffic Monitor Process 610 may access the new link information subsequent to reviewing the Server status with the Back End 250 through Back End Process Communication Interface (I/F) 640. Traffic Monitor Process 610 may also analyze the computational requirements of Cloud Server 200. For example, Traffic Monitor Process 610 may initiate new server instantiations or reduce the number of servers depending on computational load requirements at any given time through analysis using Load Balancing 660.

Subsequent to Remote Device 105 receiving the connection information (such as link information) from Remote Device Connection 650, Remote Device 105 uses the connection information to communicate with Back End 250. In the example of the connection information comprising a communication link URL, the Remote Device 105 may use the communication link URL as a means to communicate with Back End 250.

Load 660 balancing may involve invoking new server instances when new Remote Devices 105 connect to the Back End 250 or relinquishing new server instances when the Remote Devices 105 drop out of the Back End 250. This has a direct impact on how much storage or processing capability the Cloud Server 200 needs at any given time to manage the network.

Figure 7:
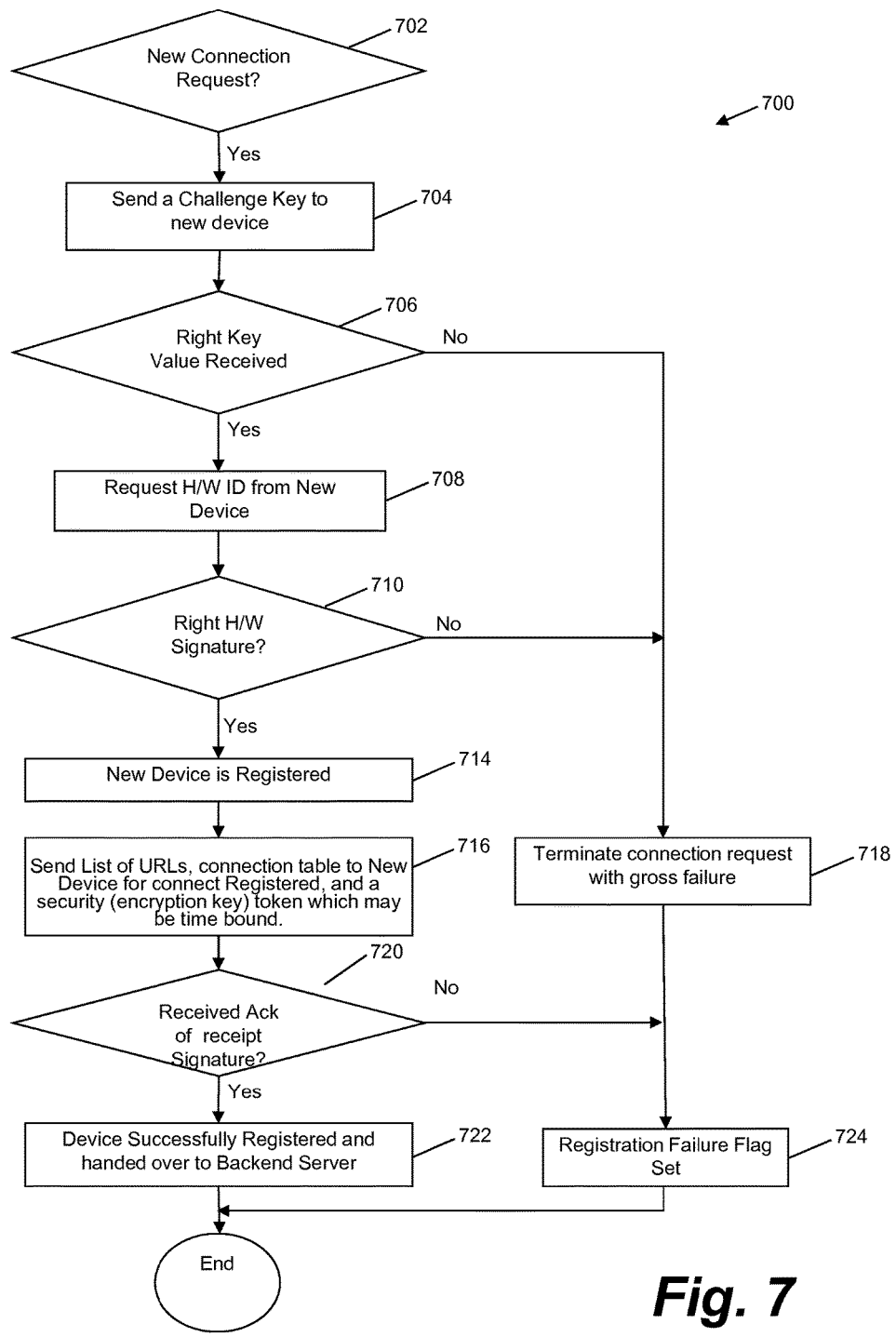
FIG. 7 is a flow diagram of processes of Traffic Cop.

Referring to FIG. 7, there is shown a flow chart 700 of the operations of Traffic Cop 210. As discussed above, one of the functions that the Traffic Cop 210 may perform is device authentication. Authentication may be prompted by a new connection request, as shown at 702. When the connection request is received, a key challenge thread is executed as shown in flow chart 700. At 704, a challenge key is sent (via remote device connection 650) to the device that sent the connection request. The remote device connection 650 sends back a key to Traffic Cop 210 for validation at 706. If the validation fails, the connection setup is terminated at 718 and a Flag is set for registration failure at 724. If the validation succeeds, the Traffic Cop 210 requests the device's hardware (H/W) ID at 708. The device then sends a H/W ID signature to Traffic Cop 210 for validation at 710. If validation fails the new connection setup terminates at 718; else, the new device connection is registered at 714. The Traffic Cop 210 then, at 716, transmits a list of valid URL's that the device can connect to the Back End server 250 along with a security token which may a time expiry associated with it. This token is used to encrypt information sent to the Back End 250 during connection. In response, the device sends an acknowledge back to the Traffic Cop 210 indicating a successful receipt. At 720, the Traffic Cop 210 determines if it has received the acknowledgement back. If no acknowledgement is received from remote device connection 650 of Traffic Cop 210, a registration failure flag is set at 724. The flag is an indication of a warning situation but not a catastrophic termination of the connection request. If the acknowledge is received from remote connection 650, at 722, the device is successfully registered and handed over to Back End 250 (which may comprise a back-end server).

Whenever a validly connected device disconnects for any reason, the Back End 250 flags the device in its connection list as not valid. The remote device connection 650 may re-initiate a connection request back to the connection manager 640. The remote device communicates with the Back End 250 with the encryption key the remote device previously received from the Traffic Cop 210. The Back End process, if it has availability, examines if the link request has come from an existing connection and then once the Back End verifies it, the Back End re-initiates the connection. However, there are exceptions to this process. The Remote Device 105 when it tries to reconnect may find that connection (URL for the Back End server) is no longer valid, either because the Back End server does not exist or the existing Back End connection is fully loaded and cannot issue a reconnect. In another situation, the link information that the remote device received from the Traffic Cop 210 may have become corrupted or the encryption key is lost or no longer works. In these situations, the control reverts to Traffic Cop 210 and the flow chart 700.

The connection table has a table of URLs (e.g., IP Addresses) which directs the devices to connect to a specific data server or spooler. Using the URL, the Remote Device 105 may then connect with Back End server 250. Traffic Monitor Process 610 may also keep track of all available Back End Servers invoked through Back End Process Communication I/F 640. As discussed above, Traffic Monitor Process 610 may also instantiate several Servers or may remove the Servers in the Back End 250 through its link with Back End Process Communication I/F 640. For example, Traffic Monitor Process 610 manages the latency of the link and if it starts to slow down, then Traffic Monitor Process 610 separates out the function and instantiates the new server and moves over the activity to the new server. This is done to augment the load and also scale down if the computation requirements reduce. Moreover, if there is an instance in which no devices are connected (or fewer devices than a predetermined threshold are connected), the entries associated with the devices are removed from the list and shutdown.

The following is a specific example of the steps in which a device connects to the Cloud Server 200. All devices may be programmed to connect to the Traffic Cop 210 using a URL stored in memory 265. Traffic Cop 210 may instruct the next available server to allocate a space for a potential new connection. On finding the load on a server over limit, Traffic Cop 210 may provision a new server and provision the device to connect to the new server once it passes all the security Identification process. On finding some of the servers have no connection anymore, the Traffic Cop 210 may shut down the server.

When devices 105 try to reconnect and discover that the servers in the list are unavailable, the devices 105 return to Traffic Cop 210 for redirection to another available server. Traffic Cop 210 may send a command to the device with a list of URL's of the specific Back End server 250 to connect to. Device may reset and try to connect to the first Back End server 250 on the list. The device will step through the list until the device finds a valid connection. If all of the URLs on the list fail, then the device returns to the Traffic Cop 210 with status. In response, the Traffic Cop 210 provides a new map to the Remote Device 105. In another embodiment of this invention the traffic cop 210 may issue either one security token (encryption key) for all the URL list or provide a security token for each URL listed in the connection list.

Once connected, the Traffic Cop 210 may perform a health check on one, some or all of the Back End servers 250 available. If a group of devices attempt to connect with the Traffic Cop 210, the Traffic Cop 210 augments the Back End server 250 instances to account for the increased load. As discussed above, the Traffic Cop 210 also may validate the Remote Device 105 to determine whether the device is a rogue device or a friendly device.

Referring back to FIG. 2, Back End 250 functions as a server to Remote Devices 105 and performs one, some or all of the following functions: handles all the two way communication module (command control and status) to remote device(s) 105; processes data packets received from Remote Device 105; stores data in the database 206; and communicates the status back to Front End 202 through the Virtual Link 215.

As shown in FIG. 2, Remote Device 105 includes a compression slave engine 220. In one embodiment, the data may be adaptively compressed to improve compression for the data packets sent by the modem. The adaptive compression is discussed in co-pending application Ser. No. 13/369,002 entitled "Adaptive Compression Scheme", hereby incorporated by reference in its entirety. Device 105 further includes a communication module. FIG. 2 illustrates the communication module as GPRS Modem 230. The communication disclosed in FIG. 2 is for illustration purposes only. Other communication modules are contemplated. Device 105 further include a transmit and receive FIFO 235, GPS 240, one or more sensor circuits 245, and a controller 225. The controller 225 may include a microprocessor 255 (or other type of logic processing device), a DSP 260, and a memory 265.

Figure 3:
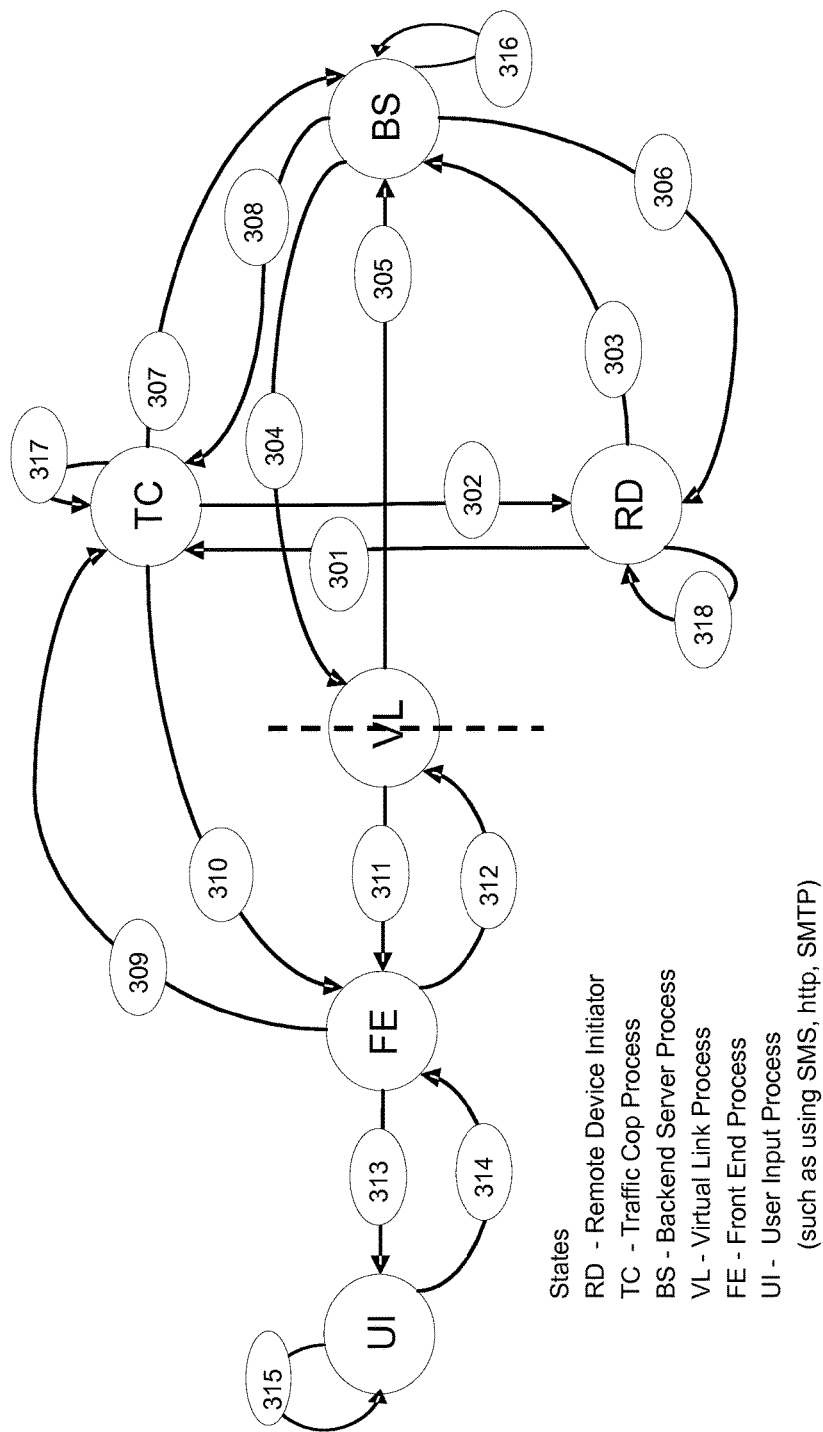
FIG. 3 is a state diagram of different processes of Cloud Server 200.

FIG. 3 is a state diagram of various processes of Cloud Server 200. In one embodiment, the cloud architecture process may be described as a series of states and transitions. The various states are illustrated in FIG. 3. There is a partition in the Virtual Link state where in the transitions 311 to 314 may be independent of the rest of the system.

State Map 1: (Connects states Remote Device Initiator (RD), Traffic Cop Process (TC), Backend Server Process (BS) and Virtual Link Process (VL): The process of connection is first initiated by the state RD (Remote Device Initiator) through the transition 301 to state TC. Transition 301 provides specific authentication packets of information containing device ID, nature of the request etc. Complement to transition 301 to state TC, a transition 302 is initiated from state TC back to state RD which provide an acknowledgement.

The transition 302 from TC to RD returns a failed flag if the device 105 authentication fails, at which point the authentication process shuts down and no further transitions are initiated. A successful authentication carries a success flag in transition 302 from TC to RD, and along with it a list of URL addresses which initiates the next transition to state BC. A success flag returned by transition 302 allows the state RD to proceed with the next state transition to state BC through the transition 303. The transition 303 carries data packets and URL to allow transition to state BS.

A successful 303 triggers a transition 304 where the new connection information is sent to state VL. The state VL updates its link list and returns any command/status request for state RD from state BC through transition 305. In response, the transition 305 returns the status/command information back to state BC through and then to state RD through transition 306. Thereafter, a new transition 303 may be initiated.

State Map 2: (Connects states User Input Process (UI), Front End Process (FE), VL): This state map has transitions that connect UI with the Front End web service state FE and the Virtual Link state VL. Command and status/data from state VL is passed onto state UI through state FE.

The transition 314 from state UI to State FE initiates an authentication request during initial login and periodically whenever there is inactivity. An authentication success is returned through state transition 313. Once the authentication process is over, subsequent transitions 314 carry requests for system information and status. A corresponding transition 313 from state FE back to state UI returns the information request carried by transition 314. This process continues until state 315 initiates a shutdown of the system. If there a time out period is reached for the inactivity, then the transition 314 will create an authentication request.

State Map 3: (Connects states TC, BS): State Map 3 performs the load balancing state transition diagram. State BS will initiate a transition 308, requesting traffic cop to provide server resource balancing as the internal metric for system load has been reached inside state BS. The transition 308 carries a Flag to indicate the type of load balancing that is requested. A positive value will indicate need for additional resource to be invoked, while a negative value will indicate a reduction in the server resources need.

State Map 4: (Connects states FE, TC): State Map 4 is for configuration of the Traffic Cop state. Transition 309 provides the initial configuration parameters for TC. These parameters will reflect how many servers need to be initialized during system setup. This transition is initiated whenever state FE needs to provide configuration parameters to state TC.

State Map—Wakeup transitions: States 315-318 are transitions. State transition 315 is the power up transition and power down transition for the UI state. The state transition is initiated by the user login. Once the transition 315 initiates a power up sequence, it automatically starts transition 314 requesting authentication. This transition also monitors system inactivity and if a threshold is reached then transition 314 is once again setup for authentication instead of requesting system information.

Transition 316 in state BC monitors the load activity of the state BC and if the threshold is reached, initiates a load balancing request to state TC through transition 308. This state monitors the health of the state BC.

Transition 317 in state TC monitors any initialization requests from state FE. This state monitors the health of state TC.

Transition 318 initiates a connection request for state RD with the TC. Whenever a disconnect happens, this state initiates the re-authentication request to state TC.

Figure 8A:
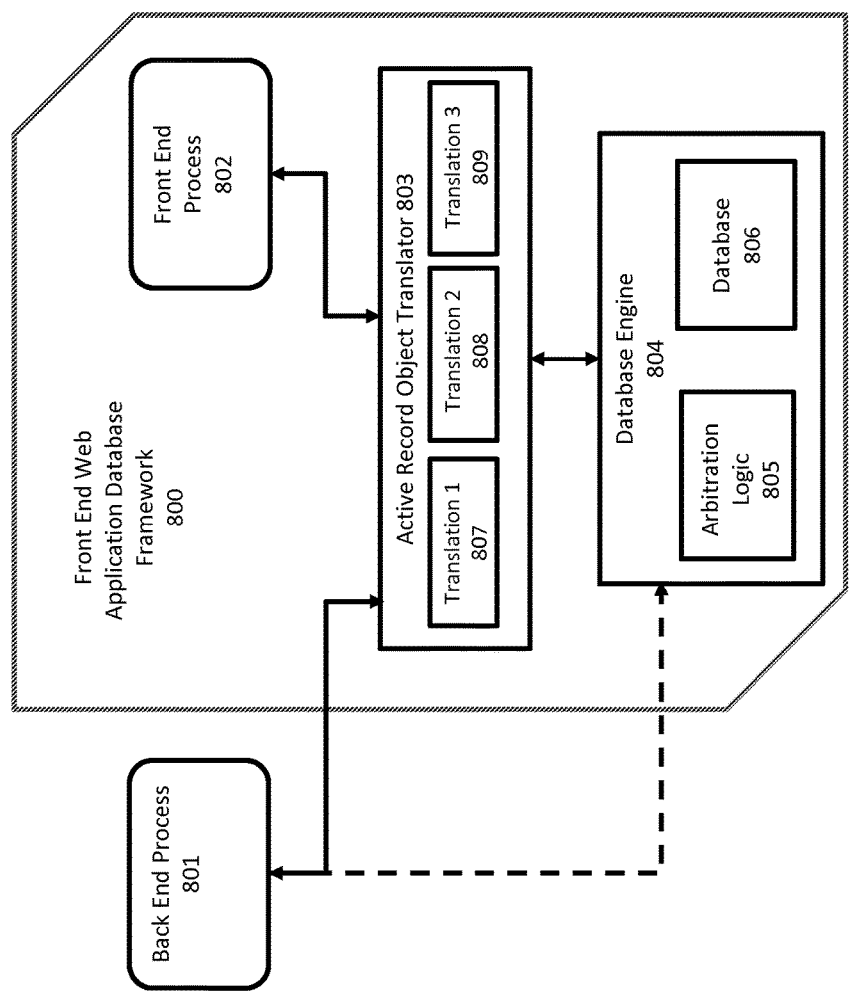
FIG. 8a is a block diagram of Front End Application Database Framework.

FIG. 8a illustrates a schematic of multiple processes interacting with the Database Engine 804. As shown in FIG. 8a, a Back End process 801 (such as performed by Back End 250) and a Front End process 802 (such as performed by Front End 202) are interacting with the Database Engine 804. As shown in FIG. 8a, Database 806 is included in Database Engine 804. Alternatively, Database 806 may be separate from and communicate with Database Engine 804.

An example of the Back End process 801 may include storage of information obtained from one of the devices 105. An example of the Front End process 802 may be a Web Process originated from Web Process 205 (such as a request originated from External Computer 270) requesting information from the database. These examples are merely for illustration purposes only.

Database Engine 804 includes Arbitration Logic 805 that is configured to provide access management and arbitration over the Database 806 by competing tasks (such as one or more tasks from Back End process 801 and one or more tasks from Front End Process 802) which need access to the Database 806. In one embodiment, Arbitration Logic 805 of the Database Engine 804 provides only one task access to the Database 806 at any given time. Further, in one embodiment, Arbitration Logic 805 of the Database Engine 804 prioritizes processes originated from Back End 250. In an alternate embodiment, Arbitration Logic 805 of the Database Engine 804 prioritizes processes originated from Front End 202. Backend data may have a higher priority as it is a WRITE function as opposed to a READ function. READ function is typically a status request or accessing the data recorded for a given remote device 105.

FIG. 8a illustrates one configuration in which a Front End Web Application Database Framework 800 comprises the Front End process 802, the Active Record Object Translator 803, and the Database Engine 804 (which includes Database 806). An alternative configuration may comprise a Back End Web Application Database Framework including the Back End process 801, the Active Record Object Translator 803, and the Database Engine 804 (which includes Database 806).

As shown in FIG. 8a, Front End process 802 interacts with the Database Engine 804 through the Active Record Object Translator 803. The Active Record Object Translator 803 may translate from one protocol to a generic or uniform data structure. Further, as shown in FIG. 8a, there are three translators (Translator 1 807, Translator 2 808, and Translator 3 809). Each of Translator 1 807, Translator 2 808, and Translator 3 809 may translate from a particular protocol into an Active Record Object Structure 810. For example, Translator 1 807 may translate from Oracle format to the Active Record Object Structure 810.

Figure 8B:
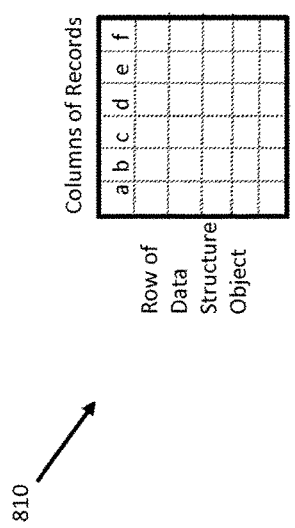
FIG. 8b is an illustration of a database object.

An example of the Active Record Object Structure 810 is shown in FIG. 8b. It comprises a representation of a data structure object row as a series of column elements. The Active Record Object Structure 810 represents a uniform data structure construct that is agnostic to a specific database, such as Oracle, Postgress, SQL. For example, the Active Record Object Translator 803 may perform a translation from a particular protocol (such as for an Oracle database) into the uniform data structure. In addition, the Active Record Object Translator 803 may perform the translation from multiple protocols concurrently, such as using Translator 1 807 for an Oracle-to-uniform translation for the Back End process 801 and using Translator 2 808 for a Postgress-to-uniform translation for the Front End process 802.

Active Record Object Translator 803 is configured to perform the translation, making this part of the parent process, thereby enabling to optimize the database process. In one aspect, the same Active Record Object Translator 803 is used for the Back End process 801 as is used by the Front End web process 802. Using a common data base framework may avoid the redesign of the communication between the backend process and the database even if the database in the future has a different architecture. For example, if the current design uses Oracle, the future design may change to Postgress. Using the architecture illustrated in FIG. 8a need not change in switching to a different database protocol. In addition, the use of the common framework allows easy data base synchronization and arbitration.

In standard implementation, the Back End process 801 interfaces to Database 806 separately (as shown by the dotted line connection between the Back End process 801 and Database 806. This interface requires a separate implementation for each database and therefore is difficult to maintain in the long run. Using the implementation illustrated in FIG. 8a reduces the difficulty in maintaining the Database 806 in the long term.

As discussed above, communications to and/or from Remote Device 105 may be in the form of packets. The Remote Device 105 may be configured to send out the information in the following packet format:

<PACKET_SIZE> <INFO> <CMD> <DEVICE_ID> <ONE_SPACE> <PAC KET_HEADER> <ONE_SPACE> <PACKET_NUMBER> <ONE_SPACE> <DATE> <ONE_SPACE> <TIME> <ONE_SPACE> <GPS_LAT_DIR> <ONE_SPACE> <GPS_LON_DIR> <ONE_SPACE> <VELOCITY> <ONE_SPACE> <TRIP_ODOMETER> <ONE_SPACE> <RESERVED> <ONE_SPACE> <IO_STATUS> <ONE_SPACE> <DATA_HEADER> <ONE_SPACE> <DATA>

Example definitions of the above include:

Constant Parameters:

| Parameter | Offset | Number of Bytes | Value (in Hex) | Description |
|---|---|---|---|---|
| PACKET_SIZE | 0 | 2 | 0x00, 0xFE | 2 bytes Data Length Data Length includes the 6 byte of API header: <PACKET_SIZE><INFO> <CMD> as part of its length |
| INFO | 2 | 2 | 0x00, 0x08 | To be ignored |
| CMD | 4 | 2 | 0x02, 0x00 | To be ignored |

The following is an example of the communication packet structure. Any device may establish the first contact with the Traffic Cop 210 with the message string provided in the table below. This condition may be triggered during i) Initial Power UP and ii) Device Reset or a GPRS session reset.

Data Format:

<Packet ID> <Packet-size> <CTRL> <INFO> <CMD> <DEVICE_ID> <CRC>

| Parameter | Number of Bytes | Value (in Hex) | Description |
|---|---|---|---|
| PACKET_ID | 2 | TBD | Packet Identifier for Traffic Cop |
| PACKET_SIZE | 2 | 0x00, 0x1A | 16-bit Data length (data length includes the 6 byte of API header (<PACKET_SIZE><INFO> <CMD>) as part of its length) |
| CTRL | 2 | | 0x1 Test, 0x2 Encrypted, all other bits TBD |
| INFO | 2 | 0x00, 0x0A | RESERVED |
| CMD | 2 | 0x08, 0x00 | RESERVED |
| DEVICE_ID | 20 | 0x20, 0x20, 0x20, 0x20, 0x20, 0x30, 0x31, 0x31, 0x35, 0x35, 0x38, 0x30, 0x30, 0x30, 0x38, 0x30, 0x37, 0x31, 0x38, 0x34 | Modem ID (20 Bytes). If Modem ID is less than 20 Bytes, it will be prefixed with blank spaces (0x20). |
| CRC | 2 | calculated | Cyclic Redundancy Check |

The following is an example of a POWERUP packet. The POWERUP Packet may be received when Device (State RD) is Reset/Powered up/GPRS session reset, and includes the following fields:

<PACKET_SIZE> <INFO> <CMD> <DEVICE_ID>

| Parameter | Number of Bytes | Value (in Hex) | Description |
|---|---|---|---|
| PACKET_ID | 2 | TDB | Packet Identifier for Traffic Cop |
| PACKET_SIZE | 2 | 0x00, 0x1A | 16-bit Data length (data length includes the 6 byte of API header (<PACKET_SIZE><INFO><CMD>) as part of its length) |
| INFO | 2 | 0x00, 0x0A | To be ignored |
| CMD | 2 | 0x08, 0x00 | To be ignored |
| DEVICE_ID | 20 | 0x20, 0x20, 0x20, 0x20, 0x20, 0x30, 0x31, 0x31, 0x35, 0x35, 0x38, 0x30, 0x30, 0x30, 0x38, 0x30, 0x37, 0x31, 0x38, 0x34 | Modem ID (20 Bytes). If Modem ID is less than 20 Bytes, it will be prefixed with blank spaces (0x20). |

Note that DEVICE_ID may change for every other device. The above value is an example for the current device.

The following is an example of a TCP Packet in which the Remote Device 105 is configured to send out the information in the following packet format:

<PACKET_SIZE> <INFO> <CMD> <DEVICE_ID> <ONE_SPACE> <PACKET_HEADER> <ONE_SPACE> <PACKET_NUMBER> <ONE_SPACE> <DATE> <ONE_SPACE> <TIME> <ONE_SPACE> <GPS_LAT_DIR> <ONE_SPACE> <GPS LON_DIR> <ONE_SPACE> <VELOCITY> <ONE_SPACE> <TRIP_ODOMETER> <ONE_SPACE> <RESERVED> <ONE_SPACE> <IO_STATUS> <ONE_SPACE>

Definitions of the Fields are as Follows:
Constant Parameters

| Parameter | Offset | Number of Bytes | Value (in Hex) | Description |
|---|---|---|---|---|
| PACKET_SIZE | 0 | 2 | 0x00, 0x77 | 2 bytes Data Length. Data Length includes the 6 byte of API header: <PACKET_SIZE><INFO><CMD> as part of its length |
| INFO | 2 | 2 | 0x00, 0x0A | To be ignored |
| CMD | 4 | 2 | 0x02, 0x00 | To be ignored |

Variable Parameters

| Parameter | Offset | Number of Bytes | Description |
|---|---|---|---|
| DEVICE_ID | 6 | 22 | Starts with a Blank space (1 Byte, value 0x20) followed by Modem ID (20 Bytes) and ends with a Blank space (1 Byte, value 0x20). If Modem ID is less than 20 Bytes, same will be prefixed with blank spaces followed by MODEM ID |
| ONE_SPACE | 28 | 1 | Blank space, value 0x20 |
| PACKET_HEADER | 29 | 8 | Please check the unique ID |
| ONE_SPACE | 37 | 1 | Blank space, value 0x20 |
| PACKET_NUMBER | 38 | 8 | Packet serial number range: "00000000" to "FFFFFFFF" For every STPF packet transmitted, the packet number is incremented. |
| ONE_SPACE | 46 | 1 | Blank space, value 0x20 |
| DATE | 47 | 8 | Copies latest GPS date: "00DDMMYY" (DD = GPS day, MM = GPS month, YY = GPS year) |
| ONE_SPACE | 55 | 1 | Blank space, value 0x20 |
| TIME | 56 | 8 | GPS time: "00HHMMSS" (HH = GPS hour, MM = GPS minute, SS = GPS second) |
| ONE_SPACE | 64 | 1 | Blank space, value 0x20 |
| GPS_LAT_DIR | 65 | 8 | GPS latitude (with cardinal info): GPS latitude times 10000 (if 'S' times −1). For example: If GPS reports 4807.0380,N (48 deg 07.0380' N), value will be stored as: 48070380 = "02DD7EEC" If GPS reports 4807.0380,S (48 deg 07.0380' S), value will be stored as: −48070380 = "FD228114" Combinations can be, DMM.MMMM DDMM.MMMM To be referenced from right to left starting from .MMMM then MM rest digits are DD |

-continued

| Parameter | Offset | Number of Bytes | Description |
|---|---|---|---|
| ONE_SPACE | 73 | 1 | Blank space, value 0x20 |
| GPS_LON_DIR | 74 | 8 | GPS longitude (with cardinal info): GPS longitude times 10000 (if 'W' times −1). For example, If GPS reports 01131.0000,E (11 deg 31.0000' E), value will be stored as: 11310000 = "00AC93B0" If GPS reports 01131.0000,W (11 deg 31.0000' W), value will be stored as: −11310000 = "FF536C50" Combinations can be, DMM.MMMM DDMM.MMMM DDDMM.MMMM To be referenced from right to left starting from .MMMM then MM rest digits are DDD |
| ONE_SPACE | 82 | 1 | Blank space, value 0x20 |
| VELOCITY | 83 | 8 | GPS velocity: GPS velocity (in knots) times 10. For example: If GPS reports 022.4 (22.4 knots = 41.4848 kilometers), value will be stored as: 224 = "000000E0" [1 knot = 1.8519999984 Km/Hr] |
| ONE_SPACE | 91 | 1 | Blank space, value 0x20 |
| TRIP_ODOMETER | 92 | 8 | Gives Trip odometer in meters. Ex: "0000135A" Indicates 4954 meters |
| ONE_SPACE | 100 | 1 | Blank space, value 0x20 |
| RESERVED | 101 | 8 | RESERVED |
| ONE_SPACE | 109 | 1 | Blank space, value 0x20 |
| IO_STATUS | 110 | 8 | Fourth byte gives IO1-IO3 & Power Status and Fifth byte gives ignition information For example: 1) 0x000DE543 D = binary 1101 (so IO1 = 1; IO2 = 1; IO3 = 0; Power = 1) E = binary 1110 (as LSB = 0 Ignition is OFF) 2) 0x0002F543 2 = binary 0010 (so IO1 = 1; IO2 = 0; IO3 = 1; Power = 0) F = binary 1111 (as LSB = 1 Ignition is ON) Note: Power = 0 indicates unit is running on battery |
| ONE_SPACE | 118 | 1 | Blank space, value 0x20 |

A TCP Serial Packet may be sent in which the Remote Device 105 is configured to send out the information in the following packet format:

<PACKET_SIZE> <INFO> <CMD> <DEVICE_ID> <ONE_SPACE> <PACKET_HEADER> <ONE_SPACE> <PACKET_NUMBER> <ONE_SPACE> <DATE> <ONE_SPACE> <TIME> <ONE_SPACE> <GPS_LAT_DIR> <ONE_SPACE> <GPS_LON_DIR> <ONE_SPACE> <VELOCITY> <ONE_SPACE> <TRIP_ODOMETER> <ONE_SPACE> <RESERVED> <ONE_SPACE> <IO_STATUS> <ONE_SPACE> <DATA_HEADER> <ONE_SPACE> <DATA>

Definition are as follows:
Constant Parameters:

| Parameter | Offset | Number of Bytes | Value (in Hex) | Description |
|---|---|---|---|---|
| PACKET_SIZE | 0 | 2 | 0x00, 0xFE | 2 bytes Data Length Data Length includes the 6 byte of API header: <PACKET_SIZE><INFO><CMD> as part of its length |
| INFO | 2 | 2 | 0x00, 0x08 | To be ignored |
| CMD | 4 | 2 | 0x02, 0x00 | To be ignored |

Variable Parameters:

| Parameter | | Number of Bytes | Description |
|---|---|---|---|
| DEVICE_ID | 6 | 22 | Starts with a Blank space (1 Byte, value 0x20) followed by Modem ID (20 Bytes) and ends with a Blank space (1 Byte, value 0x20). If Modem ID is less than 20 Bytes, same will be prefixed with blank spaces followed by MODEM ID |
| ONE_SPACE | 28 | 1 | Blank space, value 0x20 |
| PACKET_HEADER | 29 | 8 | Please check the unique ID |
| ONE_SPACE | 37 | 1 | Blank space, value 0x20 |
| PACKET_NUMBER | 38 | 8 | Packet serial number range: "00000000" to "FFFFFFFF" For every STPF packet transmitted, the packet number is incremented. |
| ONE_SPACE | 46 | 1 | Blank space, value 0x20 |
| DATE | 47 | 8 | Copies latest GPS date: "00DDMMYY" (DD = GPS day, MM = GPS month, YY = GPS year) |
| ONE_SPACE | 55 | 1 | Blank space, value 0x20 |
| TIME | 56 | 8 | GPS time: "00HHMMSS" (HH=GPS hour, MM=GPS minute, SS=GPS second) |
| ONE_SPACE | 64 | 1 | Blank space, value 0x20 |
| GPS_LAT_DIR | 65 | 8 | GPS latitude (with cardinal info): GPS latitude times 10000 (if 'S' times −1). For example: If GPS reports 4807.0380,N (48 deg 07.0380' N), value will be stored as: 48070380 = "02DD7EEC" If GPS reports 4807.0380,S (48 deg 07.0380' S), value will be stored as: −48070380 = "FD228114" Combinations can be, DMM.MMMM DDMM.MMMM To be referenced from right to left starting from .MMMM then MM rest digits are DD |

| Parameter | Offset | Number of Bytes | Description |
|---|---|---|---|
| ONE_SPACE | 73 | 1 | Blank space, value 0x20 |
| GPS_LON_DIR | 74 | 8 | GPS longitude (with cardinal info): GPS longitude times 10000 (if 'W' times −1). For example, If GPS reports 01131.0000,E (11 deg 31.0000' E), value will be stored as: 11310000 = "00AC93B0" If GPS reports 01131.0000,W (11 deg 31.0000' W), value will be stored as: −11310000 = "FF536C50" Combinations can be, DMM.MMMM DDMM.MMMM DDDMM.MMMM To be referenced from right to left starting from .MMMM then MM rest digits are DDD |
| ONE_SPACE | 82 | 1 | Blank space, value 0x20 |
| VELOCITY | 83 | 8 | GPS velocity: GPS velocity (in knots) times 10. For example: If GPS reports 022.4 (22.4 knots = 41.4848 kilometers), value will be stored as: 224 = "000000E0" [1 knot = 1.8519999984 Km/Hr] |
| ONE_SPACE | 91 | 1 | Blank space, value 0x20 |
| TRIP_ODOMETER | 92 | 8 | Gives Trip odometer in meters. Ex: "0000135A" Indicates 4954 meters |
| ONE_SPACE | 100 | 1 | Blank space, value 0x20 |
| RESERVED | 101 | 8 | RESERVED |
| ONE_SPACE | 109 | 1 | Blank space, value 0x20 |
| IO_STATUS | 110 | 8 | Fourth byte gives IO1-IO3 & Power Status and Fifth byte gives ignition information For example: 1) 0x000DE543 D = binary 1101 (so IO1 = 1; IO2 = 1; IO 3= 0; Power = 1) E = binary 1110 (as LSB = 0 Ignition is OFF) 2) 0x0002F543 |

-continued

| | | | |
|---|---|---|---|
| | | | 2 = binary 0010 (so IO1 = 1; IO2 = 0; IO3 = 1; Power = 0)<br>F = binary 1111 (as LSB = 1 Ignition is ON)<br>Note: Power = 0 indicates unit is running on battery |
| ONE_SPACE | 118 | 1 | Blank space, value 0x20 |
| DATA_HEADER | 119 | 8 | As below, |

| DATA_HEADER | SERIAL PACKET TYPE |
|---|---|
| "00000000" | RFID DRIVER ID |
| "00000100" | RFID PASSENGER ID |
| "00001000" | TAXIMETER |
| "00002000" | Unique ID |
| "00003000" | INTERFACE WAKEUP |
| "00003100" - Low,<br>"00003101" - High | INTERFACE INPUT 1 |
| "00003200" - Low,<br>"00003201" - High | INTERFACE INPUT 2 |
| "00003300" - Low,<br>"00003301" - High | INTERFACE INPUT 3 |
| "00003400" - Low,<br>"00003401" - High | INTERFACE INPUT 4 |
| "00003500" - Low,<br>"00003501" - High | INTERFACE OUTPUT 1 |
| "00003600" - Low,<br>"00003601" - High | INTERFACE OUTPUT 2 |
| "00003700" - Low,<br>"00003701" - High | INTERFACE OUTPUT 3 |
| "00004000" | TMU |

| | | | |
|---|---|---|---|
| ONE_SPACE | 127 | 1 | Blank space, value 0x20 |
| DATA | 128 | 126 | Data as described by DATA_HEADER. If Data is less than 120 bytes, will be appended by Blank spaces, value 0x20<br>12 bytes of RFID Tag for RFID packet -<br>Ex: "0018DCAE5823"<br>43 bytes of Version info for Wakeup packet -<br>Ex: "TS NEG TS_NEG_SW_VER_1.0 TS_NEG_HW_VER_1.0"<br>9 bytes of temperature for TMU Packet -<br>Ex: "+024.500C" |

A UDP Serial Packet may be sent in which the Remote Device 105 is configured to send out the information in the following packet format:

<DEVICE_ID_1> <CMD> <DEVICE_ID2 <ONE_SPACE> <PACKET_HEADER> <ONE_SPACE> <PACKET_NUMBER> <ONE_SPACE> <DATE> <ONE_SPACE> <TIME> <ONE_SPACE> <GPS_LAT_DIR> <ONE_SPACE> <GPS_LON_D IR> <ONE_SPACE> <VELOCITY> <ONE_SPACE> <TRIP_ODOMETER> <ONE_SPACE> <RESERVED> <ONE_SPACE> <IO_STATUS> <ONE_SPACE> <DATA_HEADER> <ONE_SPACE> <DATA>

Definition are as Follows:
Constant Parameters:

| Parameter | Number of Bytes | Value (in Hex) | Description |
|---|---|---|---|
| DEVICE_ID1 | 2 | Blank space (1 Byte, value 0x20) followed by 1st byte of Modem ID (1 Bytes) | To be ignored |
| CMD | 2 | 0x06, 0x00 | To be ignored |

Variable Parameters:

| Parameter | Number of Bytes | Description |
|---|---|---|
| DEVICE_ID2 | 20 | Modem ID from 2$^{nd}$ byte to 20$^{th}$ byte (19 Bytes) and a Blank space (1 Byte, value 0x20). If Modem ID is less than 20 Bytes, same will be prefixed with blank spaces followed by MODEM ID |
| ONE_SPACE | 1 | Blank space, value 0x20 |
| PACKET_HEADER | 8 | Please check the unique ID |
| ONE_SPACE | 1 | Blank space, value 0x20 |
| PACKET_NUMBER | 8 | Packet serial number range: "00000000" to "FFFFFFFF" For every STPF packet transmitted, the packet number is incremented. |
| ONE_SPACE | 1 | Blank space, value 0x20 |
| DATE | 8 | Copies latest GPS date: "00DDMMYY" (DD = GPS day, MM = GPS month, YY = GPS year) |

| Parameter | Number of Bytes | Description |
|---|---|---|
| ONE_SPACE | 1 | Blank space, value 0x20 |
| TIME | 8 | GPS time:<br>"00HHMMSS" (HH = GPS hour, MM = GPS minute, SS = GPS second) |
| ONE_SPACE | 1 | Blank space, value 0x20 |
| GPS_LAT_DIR | 8 | GPS latitude (with cardinal info):<br>GPS latitude times 10000 (if 'S' times −1).<br>For example:<br>If GPS reports 4807.0380,N (48 deg 07.0380' N), value will be stored as: 48070380 = "02DD7EEC"<br>If GPS reports 4807.0380,S (48 deg 07.0380' S), value will be stored as: −48070380 = "FD228114"<br>Combinations can be,<br>DMM.MMMM<br>DDMM.MMMM<br>To be referenced from right to left starting from .MMMM then MM rest digits are DD |
| ONE_SPACE | 1 | Blank space, value 0x20 |
| GPS_LON_DIR | 8 | GPS longitude (with cardinal info):<br>GPS longitude times 10000 (if 'W' times −1).<br>For example,<br>If GPS reports 01131.0000,E (11 deg 31.0000' E), value will be stored as: 11310000 = "00AC93B0"<br>If GPS reports 01131.0000,W (11 deg 31.0000' W), value will be stored as: −11310000 = "FF536C50"<br>Combinations can be,<br>DMM.MMMM<br>DDMM.MMMM<br>DDDMM.MMMM<br>To be referenced from right to left starting from .MMMM then MM rest digits are DDD |
| ONE_SPACE | 1 | Blank space, value 0x20 |
| VELOCITY | 8 | GPS velocity:<br>GPS velocity (in knots) times 10.<br>For example: If GPS reports 022.4 (22.4 knots = 41.4848 kilometers), value will be stored as: 224 = "000000E0"<br>[1 knot = 1.8519999984 Km/Hr] |
| ONE_SPACE | 1 | Blank space, value 0x20 |
| TRIP_ODOMETER | 8 | Gives Trip odometer in meters.<br>Ex: "0000135A" Indicates 4954 meters |
| ONE_SPACE | 1 | Blank space, value 0x20 |
| RESERVED | 8 | RESERVED |
| ONE_SPACE | 1 | Blank space, value 0x20 |
| IO_STATUS | 8 | Fourth byte gives IO1 - IO3 & Power Status and Fifth byte gives ignition information<br>For example:<br>1) 0x000DE543<br>D = binary 1101 (so IO1 = 1; IO2 = 1; IO3 = 0; Power = 1)<br>E = binary 1110 (as LSB = 0 Ignition is OFF)<br>2) 0x0002F543<br>2 = binary 0010 (so IO1 = 1; IO2 = 0; IO3 = 1; Power = 0)<br>F = binary 1111 (as LSB = 1 Ignition is ON)<br>Note: Power = 0 indicates unit is running on battery |
| ONE_SPACE | 1 | Blank space, value 0x20 |
| DATA_HEADER | 8 | As below,<br><br>DATA_HEADER    SERIAL PACKET TYPE<br><br>"00000000"    RFID DRIVER ID<br>"00000100"    RFID PASSENGER ID<br>"00001000"    TAXIMETER<br>"00002000"    Unique ID<br>"00003000"    INTERFACE WAKEUP<br>"00003100" - Low,    INTERFACE INPUT 1<br>"00003101" - High<br>"00003200" - Low,    INTERFACE INPUT 2<br>"00003201" - High<br>"00003300" - Low,    INTERFACE INPUT 3<br>"00003301" - High<br>"00003400" - Low,    INTERFACE INPUT 4<br>"00003401" - High |

-continued

| Parameter | Number of Bytes | Description |
| --- | --- | --- |
| | | "00003500" - Low, INTERFACE OUTPUT 1<br>"00003501" - High<br>"00003600" - Low, INTERFACE OUTPUT 2<br>"00003601" - High<br>"00003700" - Low, INTERFACE OUTPUT 3<br>"00003701" - High<br>"00004000" TMU |
| ONE_SPACE | 1 | Blank space, value 0x20 |
| DATA | 126 | Data as described by DATA_HEADER. If Data is less than 120 bytes, will be appended by Blank spaces, value 0x20<br>12 bytes of RFID Tag for RFID packet - Ex: "0018DCAE5823"<br>43 bytes of Version info for Wakeup packet - Ex: "TS NEG TS_NEG_SW_VER_1.0 TS_NEG_HW_VER_1.0"<br>9 bytes of temperature for TMU Packet - Ex: "+024.500C" |

The UDP Acknowledgement Packet is as follows:

| Parameter | Number of Bytes | Value (in Hex) | Description |
| --- | --- | --- | --- |
| ACK | 4 | 0x00, 0x0A, 0x01, 0x00 | To be sent whenever a packet is received over UDP |

FIG. 9 illustrates a general computer system 900, programmable to be a specific computer system, which may represent Cloud Server 100 (and subcomponents within Cloud Server 100, such as APP (controller) 101, Web App (view) 102), Cloud Server 200 (and subcomponents within Cloud Server 200, such as Front End 202, Traffic Cop 210, Virtual Link 215, Back End 250), External Computer 270, Device 105, Front End Web Application Database Framework (and subcomponents Front End Process 802, Active Record Object Translator 803, and Database Engine 804), or any other computing devices referenced herein or that may be executed by Cloud Server 100 or Cloud Server 200. FIG. 3 illustrates a state diagram and FIGS. 5 and 7 illustrate flow diagrams, all of which may be implemented on the general computer system 900 as illustrated in FIG. 9. FIGS. 4 and 6 illustrate expanded block diagrams of the Virtual Link 215 and the Traffic Cop 210, respectively. The expanded block diagrams illustrate various functionality of the Virtual Link 215 and the Traffic Cop 210 for explanation purposes. The different functionalities of the Virtual Link 215 and the Traffic Cop 210 may be implemented on the general computer system 900 as illustrated in FIG. 9. The computer system 900 may include an ordered listing of a set of instructions 902 that may be executed to cause the computer system 900 to perform any one or more of the methods or computer-based functions disclosed herein. The computer system 900 may operate as a stand-alone device or may be connected, e.g., using one or more networks as illustrated in FIGS. 1 and 2, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile computing device capable of executing a set of instructions 902 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 900 may include a memory 904 on a bus 920 for communicating information. Code operable to cause the computer system to perform any of the acts or operations described herein may be stored in the memory 904. The memory 904 may be a random-access memory, read-only memory, programmable memory, hard disk drive or any other type of volatile or non-volatile memory or storage device.

The computer system 900 may include a processor 908, such as a central processing unit (CPU) and/or a graphics processing unit (GPU). The processor 908 may include one or more general processors, digital signal processors, application specific integrated circuits, field programmable gate arrays, digital circuits, optical circuits, analog circuits, combinations thereof, or other now known or later-developed devices for analyzing and processing data. The processor 908 may implement the set of instructions 902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 900 may also include a disk or optical drive unit 915. The disk drive unit 915 may include a computer-readable medium 940 in which one or more sets of instructions 902, e.g., software, can be embedded. Further, the instructions 902 may perform one or more of the operations as described herein. The instructions 902 may reside completely, or at least partially, within the memory 904 and/or within the processor 908 during execution by the computer system 900. Accordingly, the databases 145 and 163 described above in FIG. 2 may be stored in the memory 904 and/or the disk unit 915.

The memory 904 and the processor 908 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 900 may include an input device 925, such as a keyboard or mouse, configured for a user to interact with any of the components of system 900. It may further include a display 970, such as a liquid crystal display (LCD), a cathode ray tube (CRT), or any other display suitable for conveying information. The display 970 may act as an interface for the user to see the functioning of the processor 908, or specifically as an interface with the software stored in the memory 904 or the drive unit 915.

The computer system 900 may include a communication interface 936 that enables communications via the communications networks illustrated in FIGS. 1 and 2. The communications networks illustrated in FIGS. 1 and 2 may include wired networks, wireless networks, or combinations thereof. The communication interface 936 network may enable communications via any number of communication standards, such as 802.11, 802.17, 802.20, WiMax, 802.15.4, cellular telephone standards, or other communication standards. Simply because one of these standards is listed does not mean any one is preferred as any number of these standards may never actually be adopted in a commercial product.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

We claim:

1. A cloud server comprising multiple servers, the cloud server comprising:
   an authentication server configured to authenticate one or more mobile computing devices, the authentication server comprising:
      an authentication memory; and
      an authentication processor in communication with the authentication memory, the authentication processor configured to:
         receive a request for authentication from a mobile computing device;
         determine whether to authenticate the mobile computing device; and
         in response to determining to authenticate the mobile computing device:
            generate an authentication token, the authentication token having associated therewith a time of expiry of the authentication token;
            send a link and the authentication token to the mobile computing device, the link for use by the mobile computing device to connect to a back-end server separate from the authentication server, the authentication token for encrypting information transmitted to the back-end server; and
            send the authentication token and the time of expiry to the back-end server,
   the back-end server configured to communicate with the mobile computing device in order to establish a virtual link between the one or more mobile computing devices and at least one web client, the back-end server comprising:
      a back-end memory; and
      a back-end processor in communication with the back-end memory, the back-end processor configured to:
         receive a mobile computing device communication encrypted with the authentication token;
         determine, based on the time of expiry, whether the authentication token is expired in order to determine whether to communicate with the mobile computing device; and
         wherein, responsive to determining that the authentication token has expired, the authentication server further communicates with the mobile computing device in order for the authentication server to authenticate the mobile computing device again so that the mobile computing device communicates with the back-end server or with another back-end server;
   a front-end server configured to communicate with the at least one web client; and
   a virtual link device configured to provide an appearance that the virtual link between the mobile computing device and the at least one web client is maintained when the mobile computing device reverts to the authentication server in order for the authentication server to authenticate the mobile computing device again in order for the mobile computing device to communicate again with the at least one web client.

2. The cloud server of claim 1, wherein the link comprises a communication link URL.

3. The cloud server of claim 1, wherein the authentication processor is further configured to load balance the back-end server.

4. The cloud server of claim 3, wherein the authentication processor is configured to load balance the back-end server by invoking new server instances when new mobile computing devices connect to the back-end server or by relinquishing server instances when the mobile computing devices drop out of the back-end server.

5. The cloud server of claim 4, wherein the authentication processor is further configured to:
   determine whether to disconnect a particular mobile computing device; and
   if it is determined to disconnect the particular mobile computing device, send a command to the back-end server to disconnect the particular mobile computing device.

6. The cloud server of claim 1, wherein the one or more mobile computing devices communicate with the back-end server via dedicated links through a cellular network.

7. The cloud server of claim 1, wherein the authentication processor is further configured to:
   communicate with the front-end server, the front-end server configured to communicate with a plurality of devices via an Internet.

8. The cloud server of claim 7, wherein the authentication processor is configured to receive a communication from the front-end server in order to be instantiated and initialized by the front-end server.

9. The cloud server of claim 8, wherein the back-end server communicates via cellular communication with the mobile computing device.

10. The cloud server of claim 1, wherein the back-end processor is configured to determine, based on the time of expiry, whether the authentication token is expired in order to determine whether to communicate with the mobile computing device responsive to determining that the authentication token has not been used within a predetermined time.

11. The cloud server of claim 1, wherein the authentication server is configured to send a plurality of links to the mobile computing device of a plurality of respective back-end servers, with each of the plurality of links having an associated authentication token.

12. A method for a cloud server to authenticate one or more mobile computing devices and to communicate with the one or more mobile computing devices, the method comprising:
   receiving, by an authentication server, a request for authentication from a mobile computing device;
   determining, by the authentication server, whether to authenticate the mobile computing device; and
   in response to determining to authenticate the mobile computing device:
      generating, by the authentication server, an authentication token, the authentication token having associated therewith a time of expiry of the authentication token;
      sending, by the authentication server, a link and the authentication token to the mobile computing device, the link for use by the mobile computing device to connect to a back-end server separate from the authentication server, the authentication token for encrypting information transmitted to the back-end server; and
      sending, by the authentication server, the authentication token and the time of expiry to the back-end server,
   receiving, by the back-end server, a mobile computing device communication encrypted with the authentication token, the back-end server configured to establish a virtual link between the mobile computing devices and at least one web client; and
   determining, by the back-end server based on the time of expiry, whether the authentication token is expired in order to determine whether to communicate with the mobile computing device,
   wherein, responsive to determining that the authentication token has expired, the authentication server further communicates with the mobile computing device in order for the authentication server to authenticate the mobile computing device again so that the mobile computing device communicates with the back-end server or with another back-end server,
   communicating, by a front end server, with the at least one web client; and
   providing, by a virtual link device, an appearance that the virtual link between the mobile computing device and the at least one web client is maintained when the mobile computing device reverts to the authentication server in order for the authentication server to authenticate the mobile computing device again in order for the mobile computing device to communicate again with the at least one web client.

13. The method of claim 12, wherein the link comprises a communication link URL.

14. The method of claim 12, further comprising the authentication server load balancing the back-end server.

15. The method of claim 14, wherein load balancing the back-end server comprises invoking new server instances when new mobile computing devices connect to the back-end server or by relinquishing server instances when the mobile computing devices drop out of the back-end server.

16. The method of claim 14, further comprising:
   determining whether to disconnect a particular mobile computing device; and
   if it is determined to disconnect the particular mobile computing device, sending a command to the back-end server to disconnect the particular mobile computing device.

17. The method of claim 12, further comprising:
   communicating, by the authentication server, with a front-end server, the front-end server configured to communicate with a plurality of devices via an Internet.

18. The method of claim 17, wherein communicating with the front-end server comprises receiving a communication from the front-end server in order to be instantiated and initialized by the front-end server.

* * * * *